(12) United States Patent
Laskowski

(10) Patent No.: US 7,028,888 B2
(45) Date of Patent: *Apr. 18, 2006

(54) AUTOMATED BANKING MACHINE CURRENCY TRACKING SYSTEM

(75) Inventor: Edward D. Laskowski, Seven Hills, OH (US)

(73) Assignee: Diebold Incorporated, North Canton, OH (US)

( * ) Notice: Subject to any disclaimer, the term of this patent is extended or adjusted under 35 U.S.C. 154(b) by 346 days.

This patent is subject to a terminal disclaimer.

(21) Appl. No.: 10/141,425

(22) Filed: May 7, 2002

(65) Prior Publication Data

US 2003/0085271 A1    May 8, 2003

Related U.S. Application Data

(60) Provisional application No. 60/349,202, filed on Jan. 15, 2002, provisional application No. 60/338,919, filed on Nov. 5, 2001.

(51) Int. Cl.
*G07D 7/00* (2006.01)

(52) U.S. Cl. .......................... 235/379; 705/43; 902/18; 902/21

(58) Field of Classification Search ................ 235/375, 235/379; 902/1–21; 705/43, 22, 28, 45; 194/205, 206, 217, 302, 303; 209/534
See application file for complete search history.

(56) References Cited

U.S. PATENT DOCUMENTS 4,321,672 A * 3/1982 Braun et al. ................... 705/42

(Continued)

FOREIGN PATENT DOCUMENTS

EP        1413992 A2 *  4/2004

*Primary Examiner*—Karl D. Frech
*Assistant Examiner*—Jamara A. Franklin
(74) *Attorney, Agent, or Firm*—Ralph E. Jocke; Daniel D. Wasil; Walker & Jocke

(57) ABSTRACT

An automated banking machine (10) includes a user interface (12) including an opening (20). Users of the machine deliver and receive individual sheets and stacks of sheets to and from the machine through the opening. Stacks of sheets may include sheets such as notes, checks or other documents. Stacks input to the machine may include mixtures of various types of sheets. The machine operates to receive notes, process checks and perform other operations. Notes received in the machine and assessed as valid may be recycled and dispensed to other users. Notes assessed by the machine as being of questionable validity may be marked with a removable mark and subjected to further analysis. Checks processed by the machine may be imaged by an imaging device, cancelled and stored in the machine or alternatively returned to a user. Documents produced by the machine such as receipts, checks or money orders as well as notes dispensed from the machine may be assembled into a stack within the machine and delivered from the machine through the opening.

23 Claims, 23 Drawing Sheets

U.S. PATENT DOCUMENTS

| | | | |
|---|---|---|---|
| 4,524,268 A * | 6/1985 | Fukatsu | 235/379 |
| 4,686,357 A * | 8/1987 | Douno et al. | 235/379 |
| 5,109,153 A * | 4/1992 | Johnsen et al. | 235/468 |
| 5,420,406 A * | 5/1995 | Izawa et al. | 235/379 |
| 5,489,158 A * | 2/1996 | Wang et al. | 400/103 |
| 6,021,883 A * | 2/2000 | Casanova et al. | 194/217 |
| 6,131,718 A * | 10/2000 | Witschorik | 194/206 |
| 6,550,671 B1 * | 4/2003 | Brown et al. | 235/379 |
| 6,581,746 B1 * | 6/2003 | Lundblad | 194/206 |
| 6,679,422 B1 * | 1/2004 | Brown et al. | 235/379 |
| 6,749,111 B1 * | 6/2004 | Graef et al. | 235/379 |
| 6,783,061 B1 * | 8/2004 | Graef et al. | 235/379 |
| 6,874,682 B1 * | 4/2005 | Utz et al. | 235/379 |
| 6,883,706 B1 * | 4/2005 | Mastie et al. | 235/379 |
| 2003/0116478 A1 * | 6/2003 | Laskowski | 209/534 |

* cited by examiner

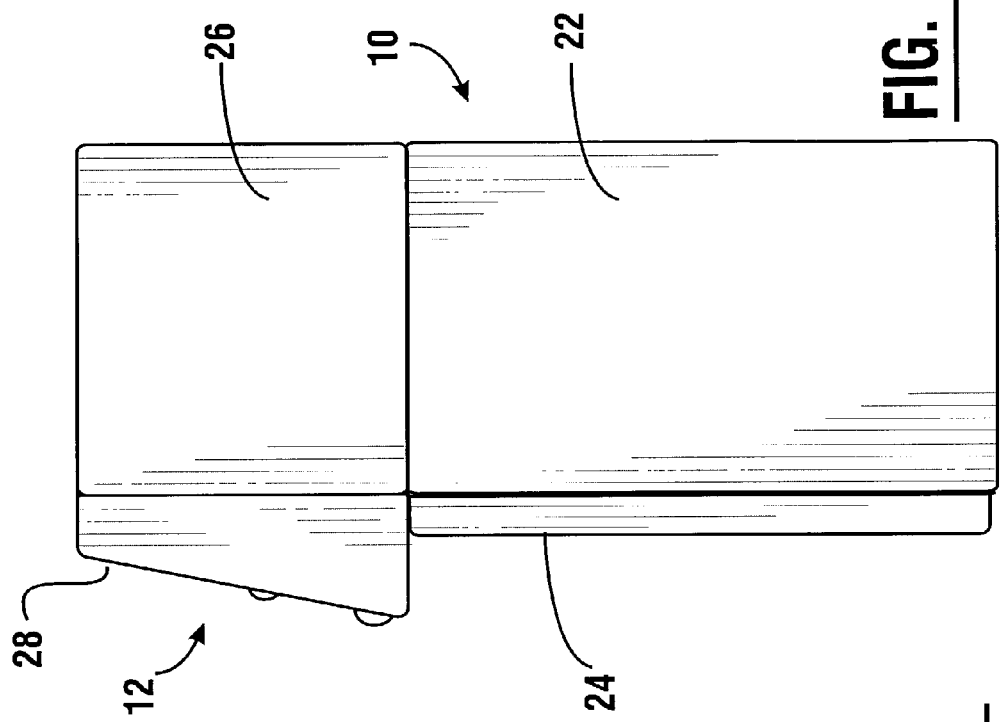
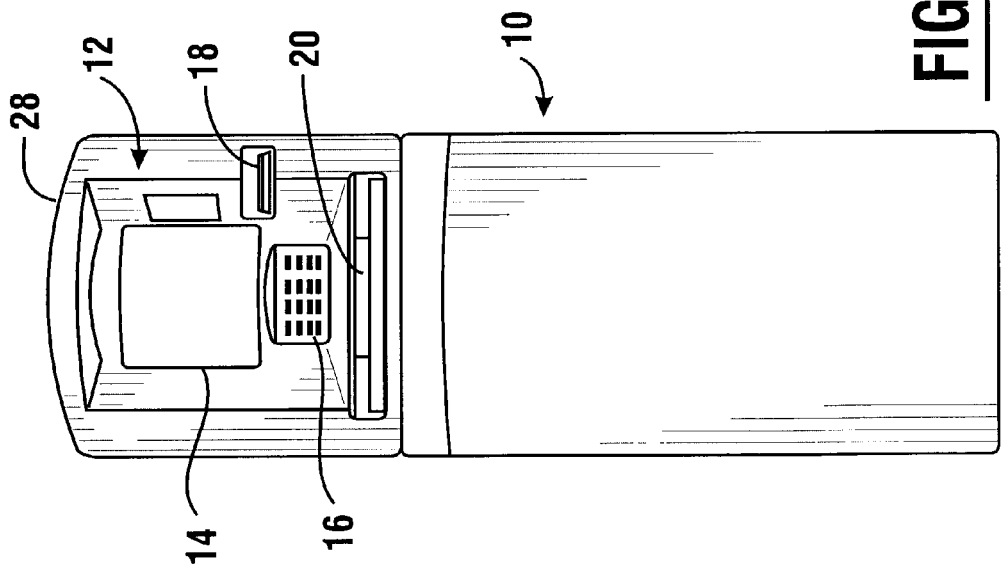

AUTOMATED BANKING MACHINE CURRENCY TRACKING SYSTEM

CROSS REFERENCE TO RELATED APPLICATIONS

This application claims the benefit of U.S. Provisional Application No. 60/349,202 filed Jan. 15, 2002, and U.S. Provisional Application No. 60/338,919 filed Nov. 5, 2001.

TECHNICAL FIELD

This invention relates to automated banking machines. Specifically, this invention relates to an automated banking machine and which delivers and receives documents such as currency notes and identifies suspect notes for analysis and handling.

BACKGROUND ART

Automated banking machines are known in the prior art. A common type of automated banking machine is an automated teller machine (ATM). ATMs may be used by individuals to receive cash from their accounts, to pay bills, to transfer cash between accounts, and to make deposits. Certain ATMs also enable customers to deposit checks, money orders, travelers checks, or other instruments. Such ATMs sometimes have the capability of creating an electronic image of a deposited instrument.

ATMs may also provide various types of sheets to customers. Such sheets include currency bills that customers withdraw from the machine. Customers may also receive sheet materials such as money orders, bank checks, scrip, stamps or other sheet materials stored in or produced by the machine. Customers may also receive from an ATM a printed sheet which is a receipt indicating the particulars of the transactions they have conducted at the machine. In addition customers may request and receive from some ATMs a more detailed statement of transactions conducted on their account.

Some ATMs have several different locations on the machine where sheets are received from or delivered to a customer. For example, most machines include one area for delivering cash to a customer and another area for receiving deposits. More than one deposit receiving area may also be provided for different types of deposits. For example, an ATM may have one opening for receiving envelope deposits, and a separate opening for receiving negotiable instruments, such as checks. ATMs may also have a particular area for delivering receipts to the customer. If the machine has the capability of printing a complete account statement on larger paper an additional area may be provided where statement sheets are delivered.

Having different areas on the customer interface of an ATM to receive and provide different types of sheets is required because each type of sheet is processed by a different mechanism within the machine. Each of these mechanisms has its own separate access to the customer. This makes machines with different features substantially different from other machines and adds complexity to their operation. Providing several different passageways and transports for receiving and providing sheet materials to customers also adds complexity and cost to a machine.

While the drawbacks associated with multiple sheet delivery and receiving openings is easily appreciated with regard to ATMs, other automated banking machines have similar drawbacks. For example the machines used by bank tellers to count currency received from customers are generally totally different machines than those used to dispense currency that is to be provided by the teller to a customer. Separate machines are also often provided for receiving and imaging checks and other types of negotiable instruments and documents of value. Often a separate terminal is provided to print a statement or record of a transaction for a customer.

Automated banking machines which accept documents such as currency notes are also becoming more common. In some such automated banking machines, a document such as a currency note may be received from a customer and assessed for validity by devices within the machine. If the presented note is determined to be valid, it may be stored in the machine and later dispensed to the same or another customer requesting to receive notes from the machine.

Such automated banking machines may occasionally receive invalid or suspect documents. When this occurs the document is generally rejected by the machine. In some circumstances it may be desirable in the case of a counterfeit document to remove the document from circulation and/or to identify the person presenting it for purposes of investigating the source of counterfeit documents. Also in some cases the documents presented may generally appear to be valid but do not meet the requirements for acceptance by the machine. However, even though such documents presented may most likely be valid, the machine may reject them because they do not meet all of the criteria set for an unequivocally valid document which is suitable to be accepted, stored and later dispensed by the machine.

Thus there exists a need for an automated banking machine and system that has the capability of receiving and dispensing documents such as notes, which has the capability of accepting and identifying invalid and suspect notes, which is capable of providing information that may be used to identify and preserve such notes and which provides the ability to contact the entity responsible for presenting the notes to the machine.

DISCLOSURE OF INVENTION

It is an object of an exemplary embodiment of the present invention to provide an automated banking machine.

It is a further object of an exemplary embodiment of the present invention to provide an automated banking machine which has a simpler customer interface.

It is a further object of an exemplary embodiment of the present invention to provide an automated banking machine which has a single opening for receiving and providing various types of sheets and documents.

It is a further object of an exemplary embodiment of the present invention to provide an automated banking machine which performs a plurality of banking transaction functions and which has a compact physical size.

It is a further object of an exemplary embodiment of the present invention to provide an automated banking machine that may be more readily configured to provide different banking functions.

It is a further object of an exemplary embodiment of the present invention to provide an automated banking machine that is economical to manufacture and operate.

It is a further object of an exemplary embodiment of the present invention to provide an automated banking machine that accepts and delivers various types of banking documents in a stack from and to customers, respectively.

It is a further object of an exemplary embodiment of the present invention to provide an automated banking machine which is capable of assessing the validity of deposited documents.

It is a further object of an exemplary embodiment of the present invention to provide an automated banking machine which is capable of marking suspect and/or invalid documents in the machine.

It is a further object of an exemplary embodiment of the present invention to provide an automated banking machine which enables tracking of a suspect or invalid document with regard to the source of the document.

It is a further object of an exemplary embodiment of the present invention to provide an automated banking machine which is capable of marking a suspect document with a removable mark which can be removed from the document if the document is later determined to be valid.

It is a further object of an exemplary embodiment of the present invention to provide an automated banking machine which marks a suspect document accepted in the machine with an indicator which corresponds to a particular transaction, account and/or user associated with placing the suspect document in the machine.

It is a further object of an exemplary embodiment of the present invention to provide an automated banking machine that marks a suspect document with a removable machine readable indicator.

It is a further object of an exemplary embodiment of the present invention to provide an automated banking machine which is usable in connection with an assessing operation which is capable of evaluating suspect documents to determine validity and of removing marks from documents determined to be valid.

It is a further object of an exemplary embodiment of the present invention to provide a method for operation of an automated banking machine system.

It is a further object of an exemplary embodiment of the present invention to provide a method of operation of an automated banking machine system in which invalid and/or suspect documents deposited in an automated banking machine are identified.

It is a further object of an exemplary embodiment of the present invention to provide a method in which suspect documents deposited in an automated banking machine are identified with a removable marking and the marking is removed after the validity of the deposited document is verified.

It is a further object of an exemplary embodiment of the present invention to provide a method by which persons responsible for depositing invalid documents in an automated banking machine may be contacted.

It is a further object of an exemplary embodiment of the present invention to provide a method by which documents deposited in an automated banking machine which are determined to be invalid are tracked to the particular entity responsible for depositing such documents in the machine.

Further objects of exemplary embodiments of the present invention will become apparent in the following Best Modes for Carrying Out Invention and the appended claims.

The foregoing objects are accomplished in an exemplary embodiment by an automated banking machine having a transport which moves sheets or stacks of sheets along a first transport path. The first transport path extends from a user accessible opening on an interface of the machine. The machine also includes an internal second transport path for transporting sheets. The second transport path meets the first transport path at an intersection. A sheet directing apparatus is positioned adjacent to the intersection. The machine further includes at least one sheet dispensing device and at least one sheet accepting device for dispensing and receiving sheets, respectively. The sheet dispensing and receiving devices are in operative connection with either the first or second transport paths.

In operation of the exemplary machine a stack of sheets which may, include various types of documents is received from a user is moved from the opening along the first transport path. As the stack passes the intersection the sheet directing apparatus is selectively operative to separate a sheet from the stack and direct the sheet into the second transport path. Once in the second transport path the separated sheet may be handled individually for processing or storage in the machine. Passing the stack through the intersection enables selectively removing sheets from the stack in response to operation of the sheet directing apparatus.

Sheets dispensed or otherwise held in the machine are enabled to be assembled into a stack by moving a sheet in the first transport path. A sheet in the second transport path is moved to the intersection in coordinated relation with the first sheet. The first and second sheets engage in aligned relation and form a stack in the first transport path as the sheets move through the intersection. Additional sheets are selectively added to the stack as the stack is thereafter again moved through the intersection while successive sheets are brought to the intersection through the second transport path. Various types of sheets are selectively assembled into the stack in the operation of the machine. Control circuitry operates the components of the machine to assemble the stack. Once the stack is assembled, it is delivered to the user by passing it along the first transport path to the user opening.

In some exemplary embodiments data may be acquired and stored which is usable to determine the individual users who have provided and/or received particular sheets from the machine. This may enable the machine to determine the source or disposition of suspect notes for example. Alternatively or in addition, exemplary embodiments may limit the dispense of documents such as checks, money orders or cash from the machine to particular individuals to reduce the risk of money laundering or other illegal or fraudulent activity. Other exemplary embodiments may include other or additional features.

In some exemplary embodiments, documents placed in the machine are assessed for validity through operation of the machine. Documents assessed as valid are stored in the machine in appropriate storage locations. In some embodiments such documents may be later dispensed to users of the machine during transactions that include the dispense of such documents. Deposited documents that are assessed as invalid in some embodiments may be marked by a marking device in the machine with a permanent mark. The permanent mark may correspond to at least a portion of an indicator associated with the particular transaction in which the invalid document was deposited. Such indicators may include for example a transaction number, account number, user number, indicia corresponding to a biometric feature of the person depositing the document or other usable indicia or combinations thereof. Such indicators may in some embodiments be human readable, machine readable or both. In some exemplary embodiments such invalid documents which are permanently marked may be stored within the machine for later recovery and delivery to proper authorities. Such delivery may be accompanied by information concerning the transaction or user responsible for presenting each invalid document.

In some exemplary embodiments, documents assessed to be of questionable validity but which are most likely valid may also be accepted in the machine. In some such embodiments documents determined to be of questionable validity may be marked by a marking device which provides a removable mark on the document. The removable mark may include at least a portion of an indicator associated with the transaction or transaction data. The removable mark may likewise be machine readable, human readable or both. In some exemplary embodiments such a marked document because it is determined to likely be valid, may be accepted and stored in the machine and the entity responsible for depositing the document may be granted a provisional credit for the deposit.

In some exemplary embodiments such questionable documents may be stored for later removal from the machine. Upon such removal the documents may be subject to an assessing operation to determine if the document is in fact valid. Such an assessing operation may be conducted manually, through operation of a machine, or both. In an exemplary embodiment the removable mark does not interfere with assessing the document for validity and remains on the document during the assessing operation. If through the assessing operation the document is determined to be valid, the removable mark may be removed from the document and the document either returned to circulation or otherwise appropriately dealt with. In the exemplary embodiment if the document is determined to be invalid, the indicator is used to determine the entity responsible for depositing the document. If a credit has been previously granted for deposit of the document, the user given the credit is notified and the credit revoked. In some exemplary embodiments the marked document may be maintained and delivered to appropriate authorities along with information concerning the transaction for purposes of investigation.

It should be understood that the embodiments described herein are exemplary and many other embodiments are encompassed within the scope of the claimed invention.

BRIEF DESCRIPTION OF DRAWINGS

FIG. 1 is a front plan view of an exemplary automated banking machine including some features of the present invention.

FIG. 2 is a left side view of the automated banking machine shown in FIG. 1.

BEST MODES FOR CARRYING OUT INVENTION

Figure 3:
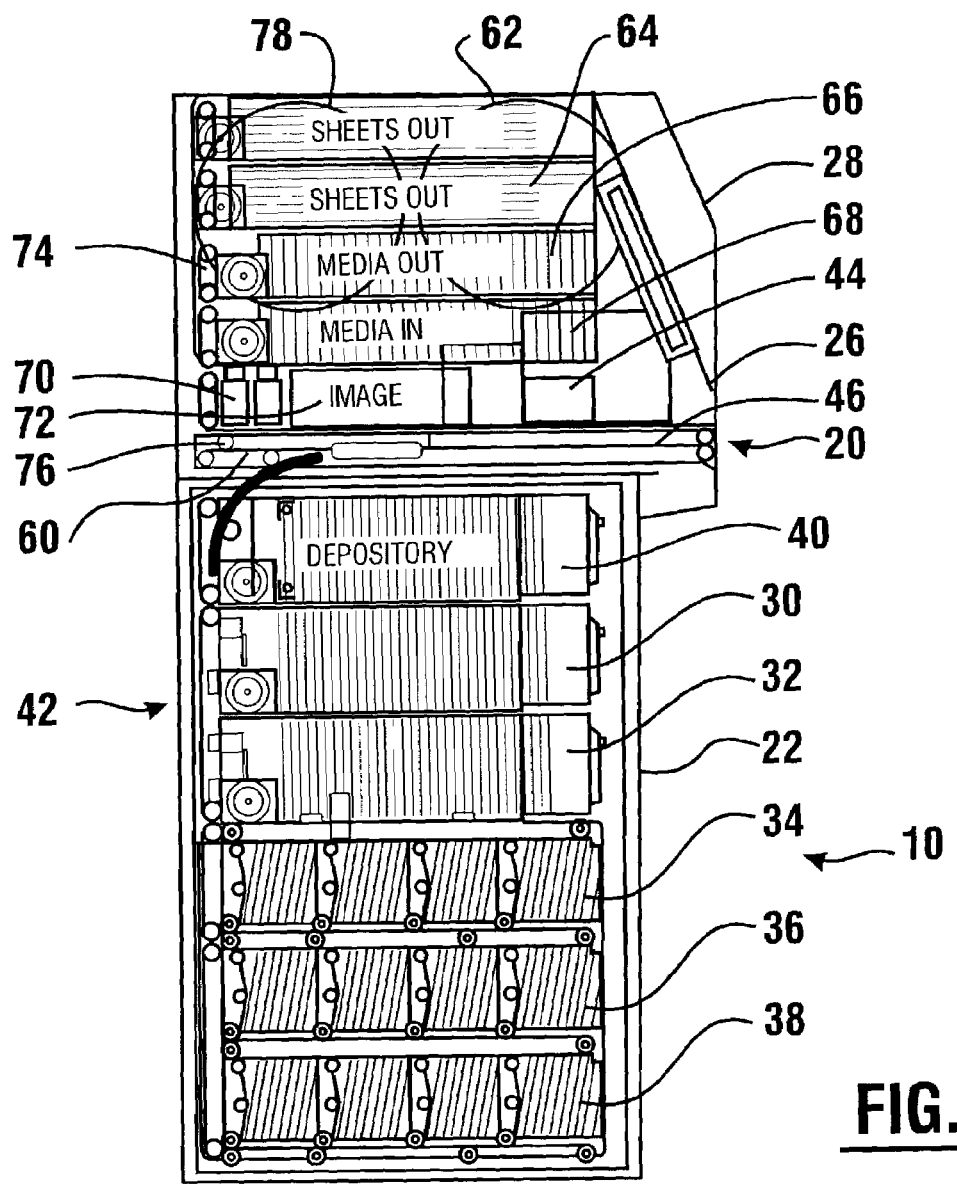
FIG. 3 is a schematic cross sectional view of the automated banking machine shown in FIG. 1.

Referring now to the drawings, and particularly to FIG. 1, there is shown therein an automated banking machine generally indicated 10. Machine 10 is an ATM. However, other embodiments of the invention may be other types of automated banking machines. ATM 10 includes a user or customer interface generally indicated 12. Customer interface 12 includes a touch screen 14. Touch screen 14 is of a type known in the prior art which serves as both an input device and an output device. The touch screen enables outputs through displays on the screen and enables customers to provide inputs by placing a finger adjacent to areas of the screen.

Customer interface 12 further includes a keypad 16. Keypad 16 includes a plurality of buttons which may be actuated by a customer to provide inputs to the machine. Customer interface 12 further includes a card reader slot 18. Card slot 18 is used to input a card with encoded data thereon that is usable to identify the customer and/or the customer's account information. Card slot 18 is connected to a card reader of a conventional type for reading data encoded on the card. Other exemplary embodiments may include types of input devices other than a card reader and/or a keypad. Some embodiments may include input devices such as biometric readers that may be operative to receive customer identifying inputs such as fingerprints, iris scans, retina scans, face topography data, voice data or other inputs that provide data that is usable to identify a user. An example of an ATM that uses biometric input devices and other types of input devices is shown in U.S. Pat. No. 6,023,688 the disclosure of which is incorporated herein by reference.

Customer interface 12 further includes an opening 20. Opening 20 as later explained, is used to receive stacks of sheets or documents from a customer operating machine 10. Opening 20 is also used to deliver stacks of documents to customers operating the machine. Although opening 20 is shown exposed in FIG. 1, it should be understood that in other embodiments it may be selectively covered by a movable gate or similar closure structure. It should be understood that these features of the described ATM user interface are exemplary and in other embodiments the user interface may include different components and/or features.

As shown in FIG. 2 machine 10 has a generally divided body structure which includes a chest portion 22. Chest portion 22 in the exemplary embodiment is preferably a secure chest and is used for holding items of value such as currency or deposits. Chest portion 22 has a door 24 which can be selectively opened to gain access to the interior of the chest portion. Door 24 preferably includes a combination lock or other locking mechanism (not shown) which prevents the chest portion from being opened by unauthorized persons.

Machine 10 further includes an upper enclosure portion 26. The upper enclosure portion has components of the customer interface 12 thereon. The customer interface portion 12 includes a fascia 28. Fascia 28 is preferably movably mounted on the upper enclosure portion 26 and may be selectively opened to gain access to components housed in the upper enclosure portion. A locking mechanism (not shown) is preferably included in the upper enclosure portion of the exemplary embodiment for preventing unauthorized persons from gaining access to the interior thereof.

As shown in FIG. 3 machine 10 includes a plurality of devices for carrying out banking transactions. It should be understood that the devices discussed hereafter are exemplary and that additional or different devices may be included in other embodiments of the invention.

The interior of ATM 10 is schematically shown in FIG. 3. The exemplary ATM includes devices for handling sheets such as notes and other documents. ATM 10 includes sheet dispensing devices, document producing devices and sheet receiving devices. Among the sheet dispensing devices are currency dispensers 30 and 32. Currency dispensers 30 and 32 may be of the type shown in U.S. Pat. No. 4,494,747, the disclosure of which is incorporated herein, which selectively dispense sheets one at a time in response to control signals. Currency dispensers 30 and 32 may include removable sheet holding containers or canisters which include indicia thereon. The canisters may be interchangeable and of the type shown in U.S. Pat. No. 4,871,085, the disclosure of which is incorporated herein. The indicia on the sheet holding canisters may be indicative of the type and/or properties of sheets held therein (i.e. currency type and denomination) and the indicia is read by a reading apparatus when the canister is installed in the machine.

The exemplary ATM may operate in response to the indicia on the canisters to adjust the operation of the dispensers to conform to the canister contents and position. In the exemplary embodiment the sheet holding canisters and other devices, may include indicia of the type shown in U.S. Pat. No. 4,871,085. The information represented by the indicia is read by the reading apparatus and the resulting signals transmitted to the machine control circuitry. The control circuitry adjusts operation of the sheet dispensing and receiving devices in response to the signals to conform to the type and character of the sheets held in the various canisters.

In the exemplary embodiment of machine 10 shown in FIG. 3, the machine preferably includes a note handling mechanism including sheet receiving and delivering devices 34, 36 and 38. The exemplary sheet receiving and delivering devices may be of the type shown in U.S. Pat. No. 6,331,000, the disclosure of which is incorporated herein by reference. The sheet delivering and receiving devices may enable receiving and storing sheets in selected compartments as well as selectively delivering sheets from the various compartments. As can be appreciated from the incorporated disclosure, some of the note handling mechanisms may receive and store notes only, others may dispense notes only and some may both receive and dispense notes. Other mechanisms may process sheets of types other than notes. Machine 10 further includes an envelope depository schematically indicated 40. Depository 40 is a device configured to accept and hold relatively thick sheet-like deposit envelopes deposited by customers in the machine.

Depository 40, currency dispensers 30 and 32 and sheet receiving and delivering devices 34, 36 and 38 are all positioned within the chest portion 22 of the machine 10. In the exemplary embodiment, the sheet dispensing and receiving devices, except for the depository, in the exemplary embodiment may be interchangeably positioned in the machine. The control circuitry adjusts operation of the machine accordingly based on the device positions and the indicia on the canisters or devices.

Each of the currency dispensers 30 and 32, sheet receiving and delivering devices 34, 36 and 38, and the depository 40 are in communication with a sheet transport path generally indicated 42. Sheet transport path 42 comprises a plurality of sheet transports which are aligned and in operative connection through a rear area of the chest portion. Sheet transport path 42 may include one or more sheet transports of the type shown in U.S. Pat. No. 5,240,638, the disclosure of which is incorporated herein. Each of the depository 40, currency dispensers 30 and 32 and sheet receiving and delivering devices 34, 36 and 38 are in operative connection with the sheet transport path 42, and are enabled to deliver sheets to and/or receive sheets from the sheet transport path 42.

Sheet transport path 42 extends through an opening (not shown) in the chest portion 22 of the ATM chest. Wiring that connects components located in the chest portion with components in the upper enclosure portion 26 also extends through an opening in the chest portion and is connected to control circuitry, schematically indicated 44. The control circuitry 44 preferably includes at least one processor in operative connection with at least one memory or data store, and is operative to carry out programmed instructions based on data stored in the memory. The control circuitry in the exemplary embodiment operates the machine to carry out the operations hereinafter described.

Upper enclosure portion 26 includes the fascia 28 and the customer accessible opening 20. A first transport path generally indicated 46 extends inside the machine from opening 20. First transport path 46 preferably includes an interwoven belt type transport of the type shown in U.S. Pat. No. 5,797,599, the disclosure of which is incorporated by reference. A transport of this type is schematically shown in FIG. 5 and is generally indicated 48.

Transport 48 includes a plurality of spaced first rolls 50 and a plurality of intermediate spaced second rolls 52. Rolls 50 and 52, which are preferably crowned rolls, support elastomeric belts thereon. First rolls 50 support first belts 54 and second rolls 52 support second belts 56. Belts 54 and 56 extend longitudinally in the transport 48.

Figure 5:
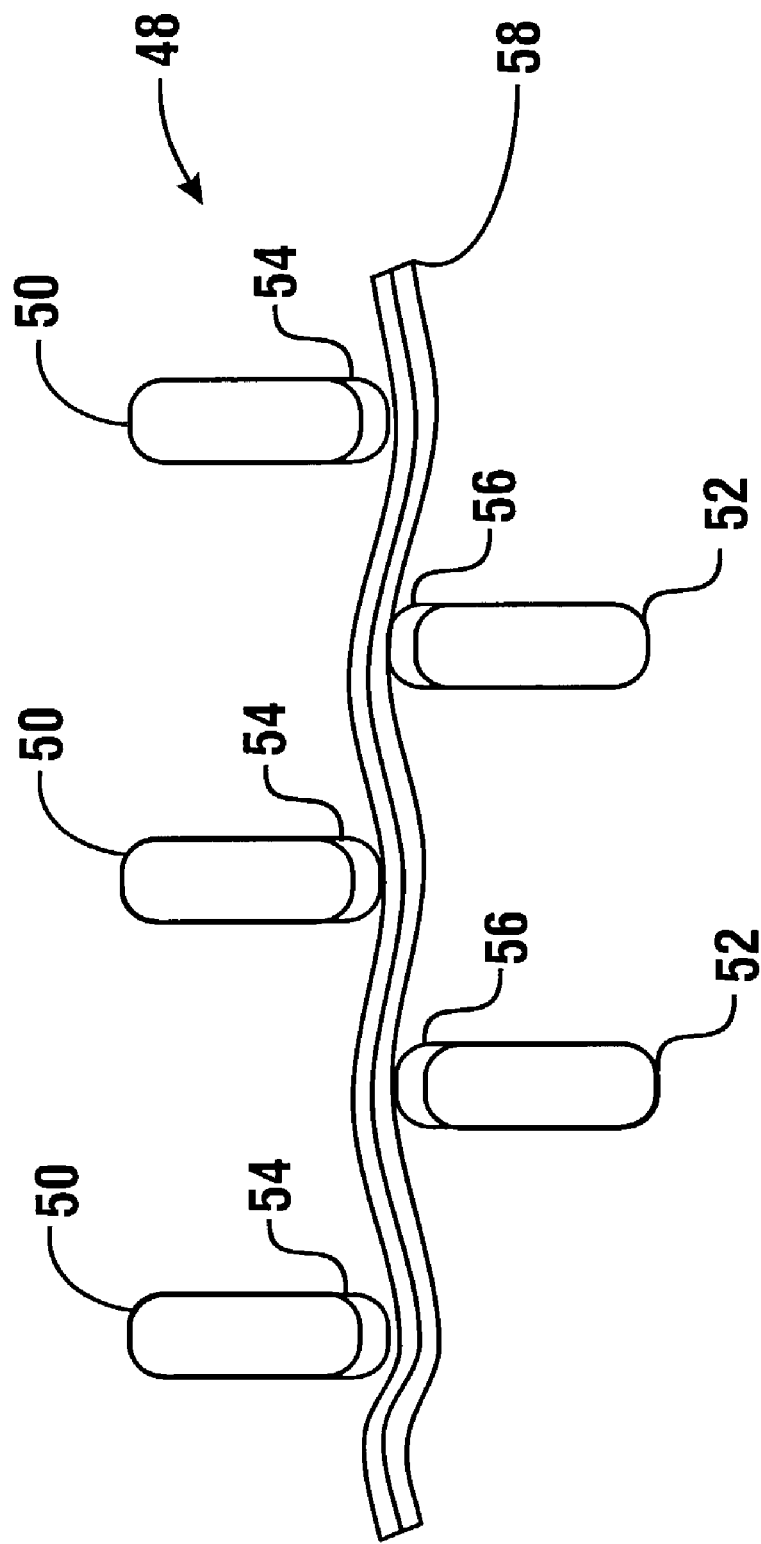
FIG. 5 is a transverse cross sectional view of a transport used in the automated banking machine.

A stack of sheets schematically represented by sheet 58 in FIG. 5, move in engaged relation with belts 54 and 56 in the transport as described in the incorporated patent disclosure. The configuration of transport 48 enables transporting stacks having varied numbers and types of sheets, as well as transporting passbooks and other forms of stacked sheets. The transport of the exemplary embodiment is useful because of its ability to transport sheets of various types, having varied thicknesses and frictional properties while minimizing skewing.

Referring again to FIG. 3, first transport path 46 intersects with transport path 42 at a first intersection, generally indicated 60. As hereinafter explained the exemplary embodiment comprises a separating mechanism that separates sheets individually from a stack and a stack assembly mechanism that produce a stack of documents. In the exemplary embodiment, sheets are selectively stacked and unstacked while moving through first intersection 60 to enable processing of sheets within the machine 10.

Upper enclosure portion 26 also includes various sheet producing, dispensing and/or receiving devices. These dispensing and receiving devices may include dispensers or devices for receiving or dispensing sheets similar to those shown in U.S. Pat. No. 4,494,747 or U.S. Pat. No. 6,331,000, and may include removable canisters for holding sheets therein. Such removable canisters may also include indicia of the type described in U.S. Pat. No. 4,871,085, which are read by apparatus within the machine. The control circuitry may be operative to control the operation of the machine in response to the indicia.

Devices 62 and 64 may serve as part of a document producing device and may hold sheets such as blank receipt or statement forms. Alternatively, one of such canisters may hold blank instruments which must be completed, such as scrip forms, money orders or travelers checks. A further sheet dispensing device 66 may dispense documents that need to be completed before dispense documents that need to be completed before dispense such as bank checks or documents that are dispensed without further processing such as plates of stamps.

A sheet receiving device 68 is also preferably included in the upper enclosure portion. Sheet receiving device 68 may be used for holding sheets such as checks or other instruments, which have been input by a customer to the machine and which have been imaged and/or canceled through processing in the machine.

The exemplary upper enclosure portion further includes at least one printing device schematically indicated 70. Printing device 70 may be used for selectively printing on sheets under control of the control circuitry. In the exemplary embodiment the automated banking machine includes marking devices. Such marking devices may comprise one or more printing devices such as device 70. Such a marking device may be used to provide a removable marking on a document. Such removable markings may comprise removable ink. Such removable ink may be visible or nonvisible ink. In some embodiments the marking device may provide a mark that is visible only when exposed to radiation within a certain frequency range. This may be for example a marking that becomes visible only when exposed to ultraviolet light. The removable markings in some embodiments may include numbers, symbols, patterns or designs or any other human or machine readable indicia that correspond to data or some other feature.

In some alternative embodiments the marking device for providing a removable mark to documents within the machine may include a device which applies a removable self adhesive label. Such a label may be printed or otherwise produced by an appropriate device within the machine and then applied to documents. Of course in some embodiments, combinations of types of marking devices may operate to apply different types of markings to documents in a machine.

In addition or in the alternative exemplary embodiments may include a device for applying a permanent marking to documents. Such permanent marking may include marking with a permanent ink, label or other indicia. Such permanent marking may also include permanently modifying or damaging a document such as by punching holes, shredding or other process which provides a generally permanent indication on the document. It should be appreciated that multiple types of marking devices may be provided in various embodiments depending on the operations to be carried out by the machine. In addition other embodiments may include devices for applying permanent or temporary markings different from those that are discussed herein.

An imaging device schematically indicated 72 is also included in the exemplary machine. Imaging device 72 is preferably of the type which enables reading and generating an electronic image of a document, such as that shown in U.S. Pat. No. 5,534,682 or U.S. Pat. No. 5,923,413 the disclosures of each of which are incorporated as if fully rewritten herein. In some embodiments an imaging device may operate in conjunction with the control circuitry to produce signals which comprise an electronic representation of an image of a check or other instrument. The electronic representation may include all or selected portions of one or both sides of the sheet. For example in some situations it may be suitable to obtain an electronic image of alphabetic, numerical and/or other symbols or features on the check. For example such data may be analyzed using character recognition software such as software commercially available from Check Solutions Inc., A2ia or other companies to determine the maker, amount and/or other data pertinent to the check for purposes of receiving and/or cashing the check.

In some embodiments printing devices, marking devices or other devices may also serve as part of a cancellation device. Such a cancellation device may serve to print or otherwise mark checks or other documents received by the machine. For example, the machine may mark as cancelled checks which are received and processed by the ATM. In some embodiments such checks or documents may be marked through operation of the cancellation device and then stored in a check storage location in the machine. In other embodiments the cancellation device after the document has been imaged, may mark the document to indicate that it has been cancelled and return the cancelled document to the user of the machine. In some embodiments one or more such cancelled documents may be assembled in a stack in a manner hereafter discussed, when returned to a user. Cancelled documents may also be returned in an assembled stack with other documents such as a receipt for the transaction and/or notes dispensed by the ATM as a result of cashing the check. In some embodiments cancelled checks may be shredded, compacted or otherwise marked to avoid any fraudulent use. The control circuitry may also operate to store data corresponding to the check and the identity of the user of the ATM providing the check to the machine in one or more data store for purposes of record keeping. For example the data store may store data corresponding to the check with the data that corresponds to a user's account number, biometric data, photograph or other data usable to identify a user. Of course these approaches are exemplary and other approaches may be used.

In some embodiments the control circuitry may operate to check the user identity data before cashing one or more checks. The control circuitry may also be programmed to limit the risk of check cashing by unauthorized persons and/or to reduce the risk of money laundering. For example before cashing a check the control circuitry may operate to compare data corresponding to the characters identifying the payee indicated on the check to other input data corresponding to the user of the machine and/or to the characters on the check comprising the endorsement. If the payee, user and/or endorsement data does not correspond, the control circuitry may operate so that the check is not accepted or cashed. Further the control circuitry may operate to determine the amount and/or nature of checks the particular user has presented at the ATM and/or within a prior time period. The ATM may also operate to communicate with other computers in a network to determine the amount or nature of checks presented by the user at other ATMs. If the user's check presenting activities fall outside certain established programmed parameters, such that the user's activities may be indicative of theft of the check or money laundering, for example, the ATM may refuse the transaction.

In the alternative and/or in addition a user presenting a check may be required by the control circuitry to provide at least one biometric input. This may be done even in circumstances where the user may be identifiable by data on a card or another manner. The biometric identification data may be compared to stored data and used to evaluate the check cashing activities of this particular user. A determination may be made by the control circuitry or by a remote computer to determine if the activities fall outside the established parameters such that the current transaction is suspicious and not permitted. In this way a user with multiple cards and/or multiple identities may be prevented from conducting transactions that might be suspicious in terms of theft or money laundering. Of course some embodiments may also operate to cross check biometric data with data on a debit or credit card or other item or other device presented by the user to the ATM to provide greater assurance as to the identity of the user. Of course in other embodiments other approaches may be used.

The exemplary handling devices 62, 64 and 66, as well as the sheet receiving device 68, of the ATM are all in communication with one or more transports. These transports may be of the type shown in U.S. Pat. No. 5,342,165, the disclosure of which is incorporated herein, or other suitable sheet transport devices. The sheet transport devices form a sheet transport path 74. Sheet transport path 74 extends to transport path 46 and meets transport path 46 at a second intersection 76.

The upper enclosure portion may also include additional or other devices. Such devices may include a journal printer as schematically indicated by rolls 78. The journal printer is used to make a paper record of transactions conducted at machine 10. Electronic journals may also be made by the control circuitry and stored in memory. Other devices which may be included in the machine are other types of document producing devices, audio output devices, customer sensors, cameras and recorders, biometric sensing devices and other apparatus suitable for use in the operation of the particular type of automated banking machine.

Figure 4:
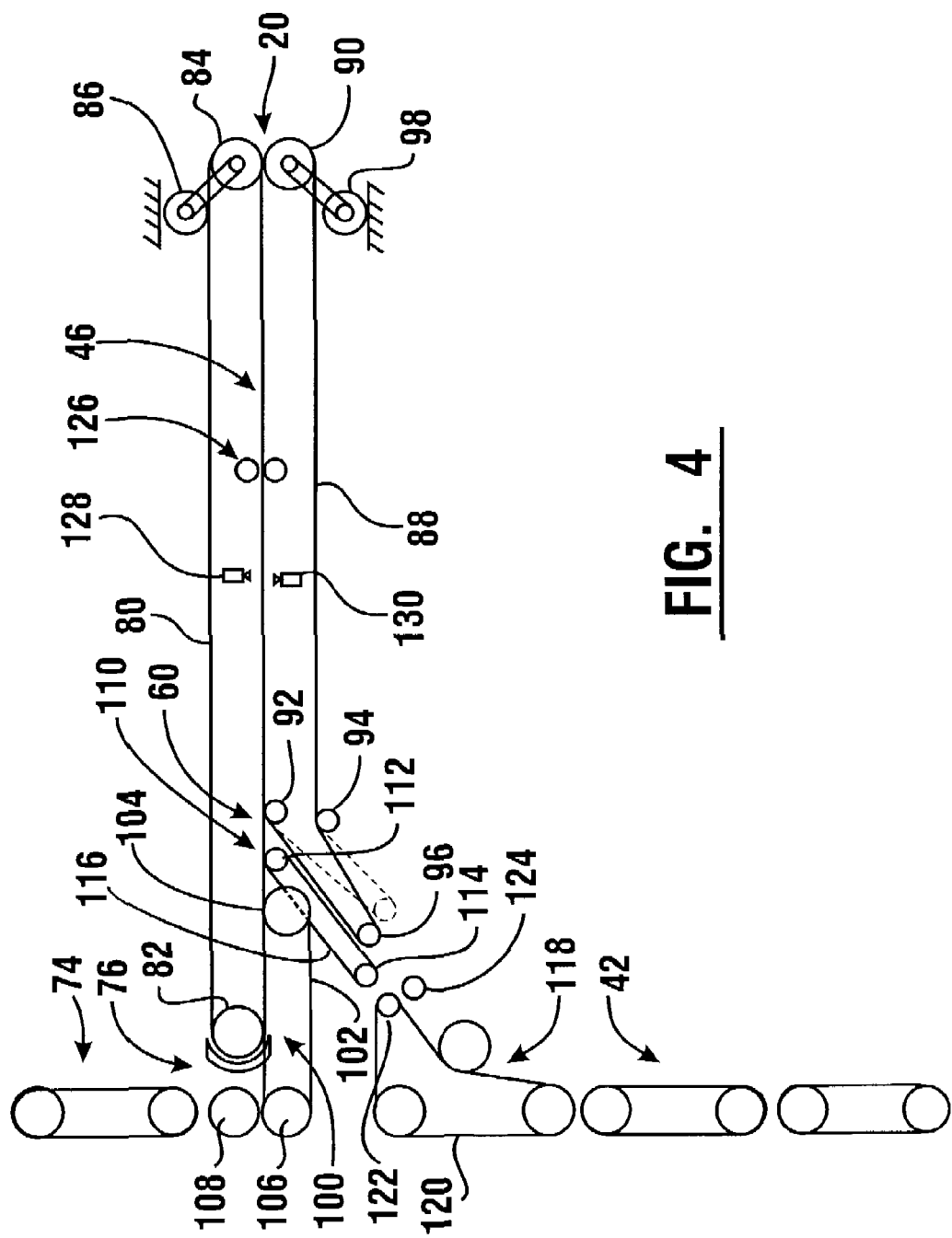
FIG. 4 is a side schematic view of a first transport path and a second transport path in the automated banking machine.

Transport paths 42, 46 and 74 of the exemplary machine are shown in greater detail in FIG. 4. Although the transports and operation thereof are described in detail it should be understood that they are merely exemplary of devices which may be used and the claimed invention is not limited thereto. Transport path 46, which includes one or more transports of the interwoven belt type shown in FIG. 5. The transport path has therein a plurality of first belts 80 which extend between first rolls 82 and 84. First rolls 82 and 84 are selectively driven by a reversible drive, schematically indicated 86.

Second belts 88 extend between a second roll 90 and rolls 92, 94 and 96. Second belts 88 are driven by a second reversible drive schematically indicated 98. As shown in FIG. 4, roll 96 is selectively movable for purposes which are later explained. Of course it should be understood that the belts and rolls shown in the first transport path 46 are actually a plurality of spaced belts and rolls of the type shown in FIG. 5.

First transport path 46 further includes a further transport section 100. Transport section 100 is similar to the transport shown in FIG. 5 and includes a plurality of third belts 102 journaled on spaced rolls 104 and 106.

Rolls 106 have positioned adjacent thereto a plurality of holding rolls 108. Rolls 108 are positioned in spaced axial intermediate relation of third belts 102. This configuration imparts a wave configuration to sheets and stacks of sheets in a manner comparable to that imparted to sheets held by transport 48 as shown in FIG. 5. Holding rolls 108 and transport section 100 are independently driven by reversible drives (not shown) under the control of the control circuitry 44.

Adjacent to first intersection 60, where sheet path 42 meets sheet path 46, is a sheet directing apparatus generally indicated 110. Sheet directing apparatus 110 includes sheet engaging rolls 112 and further rolls 114. Rolls 112 and 114 have resilient belts 116 mounted thereon. It should be understood that rolls 112 and 114 are driven by one or more independent reversible drives (not shown) under control of the control circuitry 44. It should be understood that rolls 112 and 114 and belts 116 in FIG. 4, represent a plurality of such belts and rolls which are preferably disposed in intermediate relation between the lower flights of first belts 80.

Transport path 42 further includes transport 118 which is adjacent to depository 40. Transport 118 includes a plurality of rolls which drive belts 120 in response to a reversing drive (not shown). Rolls 122 which are engaged with belts 120, as well as rolls 124 which are independently driven by one or more reversible drives (not shown), are positioned in the sheet path 42 adjacent to rolls 114 and 96. The purpose of this configuration is later discussed in detail.

As schematically represented in FIG. 4 transport path 46 includes sensing devices. These sensing devices are in operative connection with the control circuitry 44, and operate to sense features of sheets and stacks of sheets in the sheet transport path. A thickness sensor schematically indicated 126 is preferably provided for sensing the thickness of sheets, stacks of sheets, or sheet like deposit envelopes that move along transport path 46. Indicia reading devices 128 and 130 are preferably operative to sense indicia on sheets and envelopes moving in the transport path. The sensing devices may include photo reflective devices, magnetic sensing devices or other appropriate devices for distinguishing features of currency, various types of negotiable instruments and/or deposit envelopes. For example in some embodiments the sensing devices in combination with the control circuitry or other circuitry in the machine may comprise a validating device or assessing device for assessing the validity of notes or other documents. An example of such a device is shown in U.S. Pat. No. 5,923,413 the disclosure of which is incorporated herein.

In some embodiments the validating or assessing device may additionally or alternatively be operative to identify individual notes. For example, the validating device may produce through algorithms one or more distinctive values that are generally uniquely associated with a particular note. In addition or in the alternative, the validating device may include character recognition capabilities which enable determination of the serial numbers or other unique characters associated with particular notes. This may enable some embodiments of the machine to store in correlated relation in at least one data store, data that uniquely identifies a note input to the ATM and the particular user who provided the note to the machine. This may enable the ATM to identify a particular suspect note and capture the information on the user who provided it to the machine. The particular type, position and capabilities of sensing devices and/or validating devices used in a particular machine will depend on the characteristics and types of documents which are intended to be processed by the machine.

In some exemplary embodiments the assessing device may operate in the manner of the incorporated disclosure to assess the validity of documents such as currency notes deposited in the machine. In response to a note being assessed as valid, the machine may operate in accordance with the programming of the control circuitry to store the valid note in an appropriate location within the machine. In some exemplary embodiments this location may be in a storage location in which the note may be stored and from which the note may be subsequently dispensed to a user of the machine in the course of a transaction in which such a note is required. This may be for example dispensing cash to a subsequent user of the machine who requested cash withdrawal as part of the transaction. This occurs after the transaction of the user which resulted in the note being deposited in the machine.

In some exemplary embodiments a document may be identified as invalid. This may be based on the fact that the document has properties of a known counterfeit note. The control circuitry of the machine may be programmed to identify such notes. In such circumstances exemplary embodiments may be programmed to cause the invalid note to be marked by one or more marking devices. In some exemplary embodiments the marking provided by the marking device may be a permanent mark or a removable mark. In some exemplary embodiments the mark may include at least a portion of an indicator which is associated with the transaction. This indicator may include a transaction number which is unique to the particular transaction in which the invalid document was deposited. Alternatively or in addition, the indicator may be indicia associated with an account of a user of the machine on whose behalf the invalid document was presented. Alternatively or in addition, the note may be marked with indicia corresponding to a biometric identifier associated with the particular user who deposited the document. Of course combinations of such markings may be applied. Further such markings may be wholly or partially in machine readable form such as bar code. In addition or in the alternative, such markings may include visible and/or nonvisible ink, the application of a label or other marking so as to identify the invalid document and to associate it with information which enables the source and/or circumstances related to the deposit of the document in the machine to be tracked or determined.

In an exemplary embodiment invalid documents are stored in a first storage location in the machine for later removal and study. Also in the exemplary embodiment the information concerning the indicator or other documentation may be stored in a data store in the machine and/or transmitted to one or more remote computers in a network. Such information may be used for purposes of notifying the entity responsible for operating the machine such as a bank, an entity responsible for the customer and/or account into which the invalid document was attempted to be deposited and/or appropriate authorities who are responsible for issues related to counterfeit currency or other invalid documents. In alternative embodiments a document determined to be invalid may be permanently marked so as to render it plainly unsuitable to be further passed and then returned to the user.

In some exemplary embodiments documents that are assessed by the machine may be assessed as likely to be valid, but of such questionable validity that the assessing device cannot provide assurance of document validity. In an exemplary embodiment when a document is determined to be of questionable validity, the control circuitry operates the automated banking machine to mark the document with a removable mark. This removable mark may include an indicator associated with the transaction, the user or other circumstances as previously discussed. The removable mark may comprise visible or nonvisible markings including markings in inks or other materials that are only visible when exposed to radiation within a certain frequency range. Such marking may also or alternatively include machine readable indicia, information corresponding to a biometric feature of the user or other data which may be correlated with the transaction, account or user. In some exemplary embodiments the removable marking may include water soluble ink or other material that can be relatively readily removed by appropriate washing agents in the event that the note is eventually determined to be valid. In addition or in the alternative, the removable marking device may employ a removable label or other indicator that may be applied in a semi-permanent fashion but removed as necessary if the deposited document is subsequently determined to be valid.

In some exemplary embodiments the automated banking machine upon receipt of a document of questionable validity, may operate in conjunction with remote computers to provide the account user or upon whose behalf the document is presented with a credit for the deposited document. In such exemplary embodiments the credit may be subject to confirmation or revocation upon further assessment of the document for validity during a subsequent assessing operation which is later described.

First various sheet manipulating and processing operations performed by the exemplary automated banking machine of the described embodiment are now explained in detail with reference to FIGS. 6–21.

Figure 6:
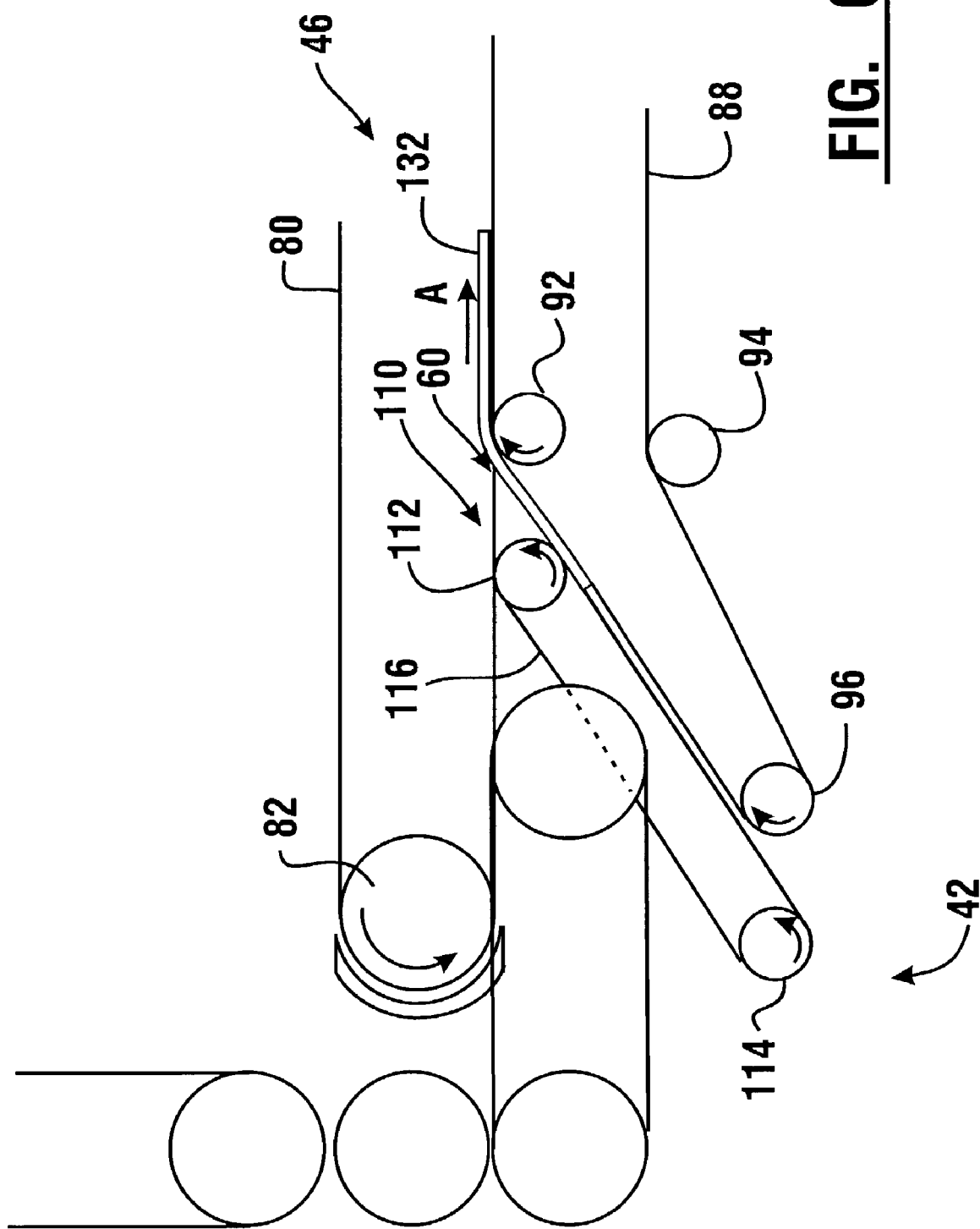
FIG. 6 is a schematic side view of a sheet moving from the second transport path to the first transport path through an intersection.

FIG. 6 shows a sheet 132 moving through the intersection 60 of the first sheet path 46 and sheet path 42. Sheet 132, prior to reaching the position shown in FIG. 6, may have been dispensed by one of the sheet dispensing devices positioned adjacent to transport path 42 and moved adjacent to the intersection by one or more transports which make up the transport path. As sheet 132 approaches the intersection it is engaged by belts 116 of the sheet directing apparatus 110, as well as belts 88. The control circuitry operates the drives which move the belts to work in cooperating relation to move the sheet toward the intersection. Once the sheet is passed through the intersection it is engaged between the lower flights of belt 80 and the upper flights of belts 88, and the sheet 132 is carried in the first direction indicated by Arrow A in FIG. 6. As will be appreciated from FIG. 4, Arrow A is in the direction of the customer opening 20 of the automated banking machine.

Figure 7:
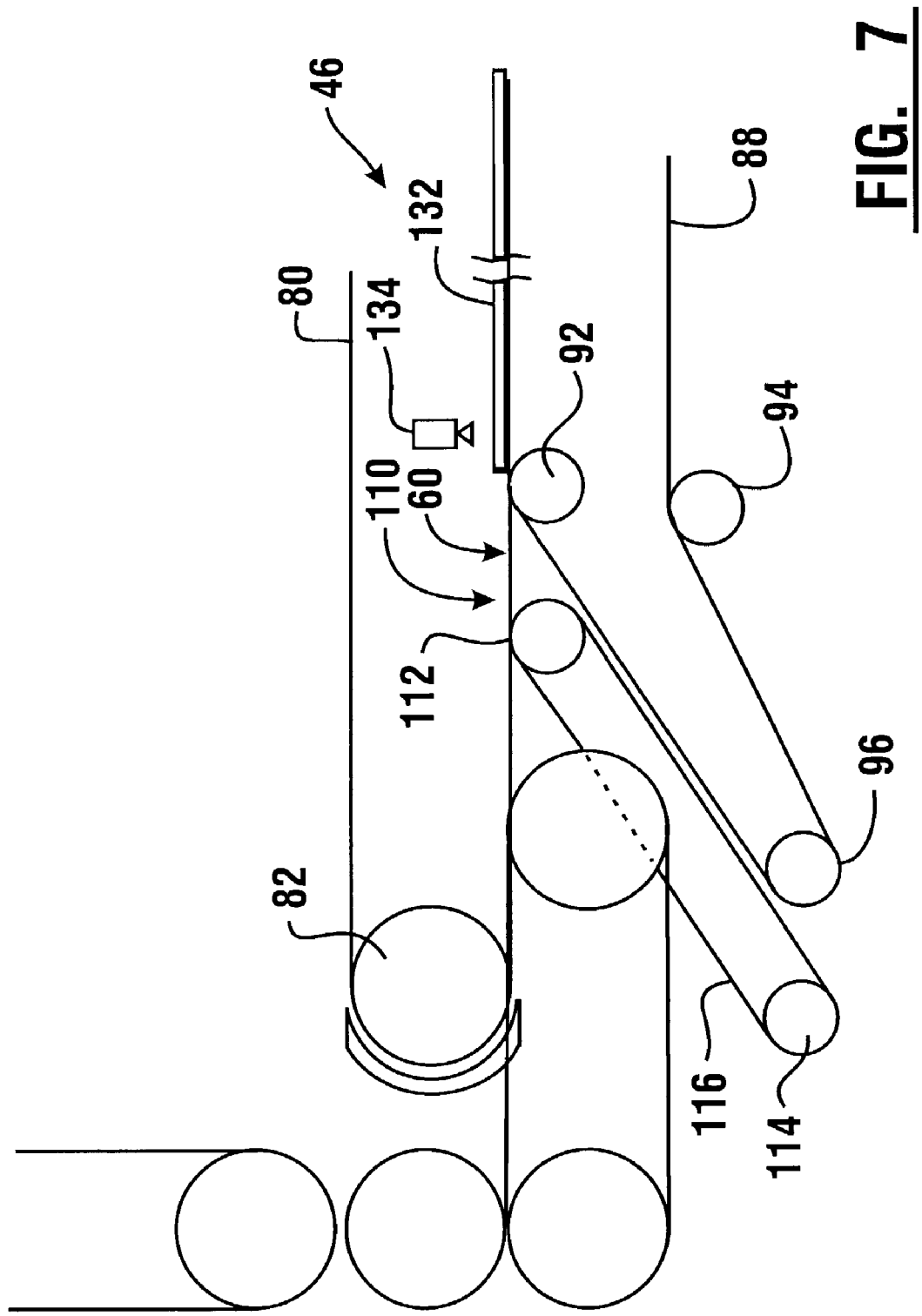
FIG. 7 is a view similar to FIG. 6 with the sheet moved into the first transport path from the intersection.

As shown in FIG. 7 in the mode of operation currently being described, the structures act as a stack assembly mechanism. Once sheet 132 is fully moved through the intersection in the first transport path 146, movement of the sheet in the first direction is stopped. This is accomplished by the control circuitry 44 operating the transport drives in accordance with its program logic stored in memory, and in response to customer inputs at the customer interface. A sensor schematically indicated 134 positioned in the first sheet path senses the position of the sheet. Sensor 134 is in operative connection with the control circuitry. Sensor 134 may be one of several types of sensors suitable for sensing the position of sheets, such as a photo reflective type sensor. Once sheet 132 is in the position shown in FIG. 7, belts 80 and 88 are stopped.

Figure 8:
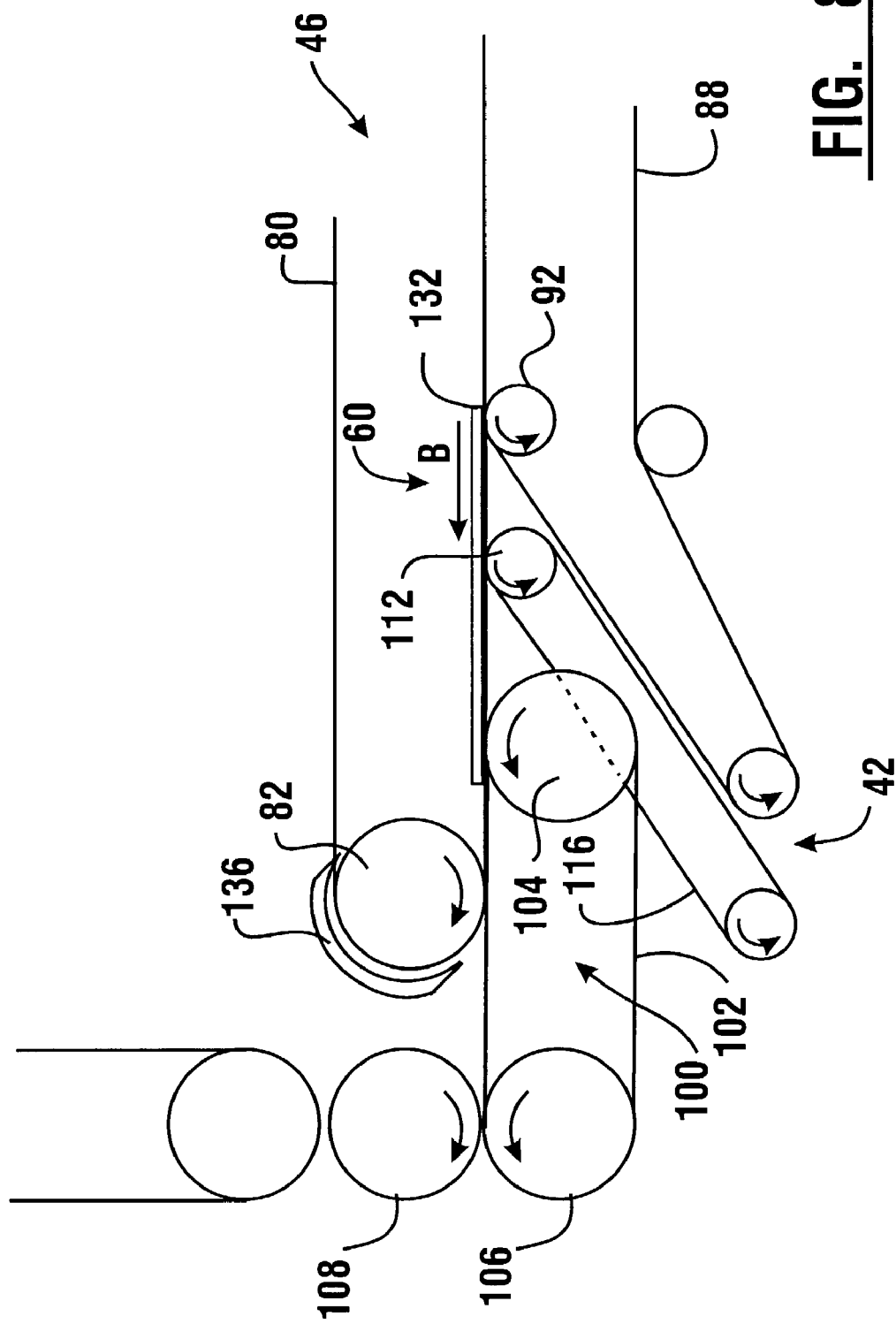
FIG. 8 is a schematic view similar to FIG. 7 with the sheet moving in an opposed direction through the intersection.

As shown in FIG. 8, the control circuitry now operates the components of the machine to move sheet 132 in a second opposed direction as indicated by Arrow B. To move sheet 132 through the intersection in the opposed direction, sheet engaging rolls 112 and belts 116 rotate to prevent sheet 132 from passing into the second sheet transport path 42. Transport section 100 is also operated by the control circuitry to engage sheet 132 and move it in the opposed direction. A sheet turnover member 136 later described in detail, is moved to enable sheet 132 to pass roll 82 in the first sheet path.

Figure 9:
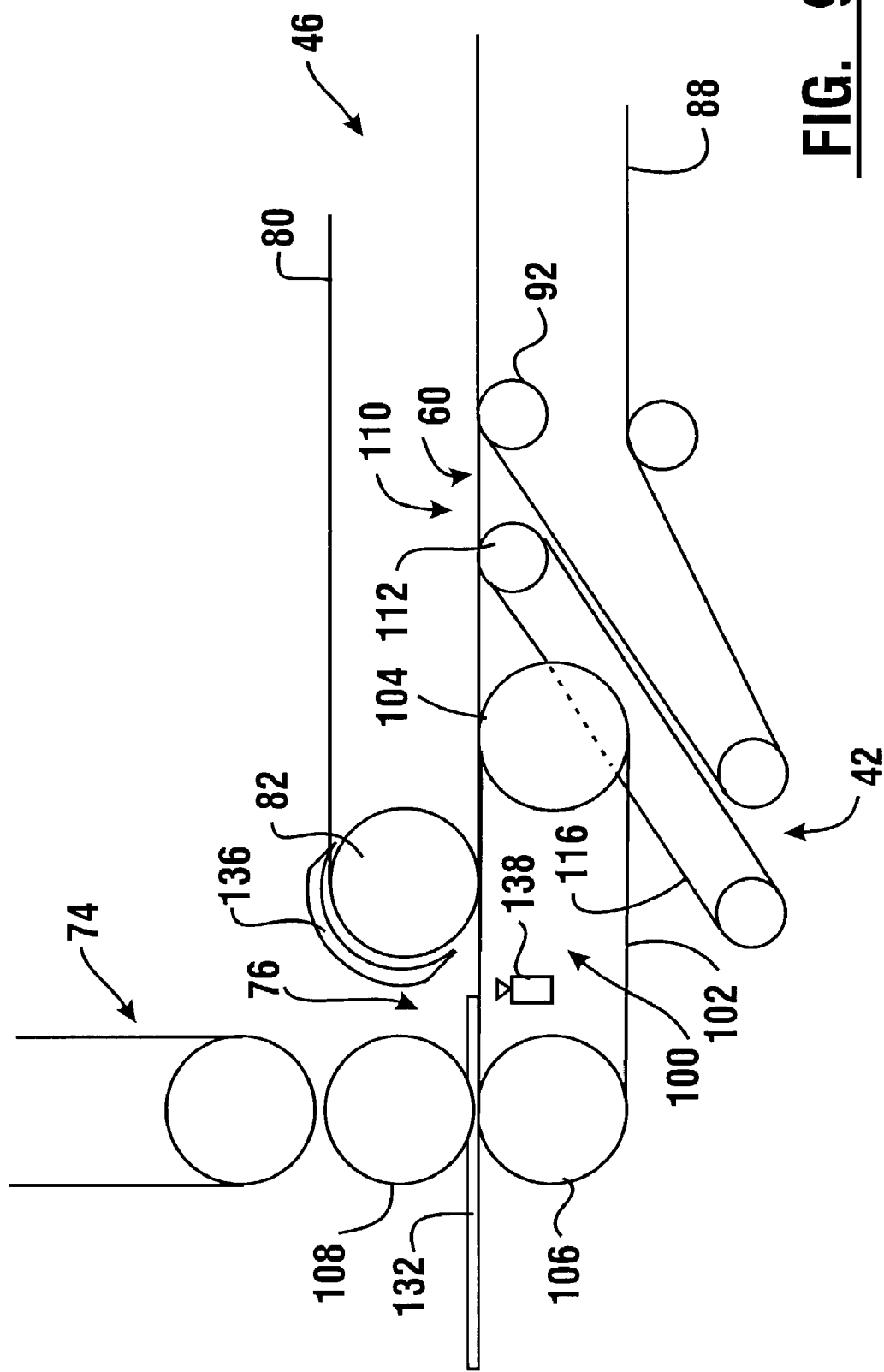
FIG. 9 is a schematic view similar to FIG. 8 with the sheet held in a holding device.

As shown in FIG. 9 sheet 132 is moved in the second direction until it is engaged between holding rolls 108 and transport section 100. A sensor which is schematically indicated 138 is positioned to sense that sheet 132 is positioned in the holding device provided by the combination of holding rolls 108 and transport section 100. Sensor 138 is operatively connected to the control circuitry which operates to stop further movement of sheet 132 in the second direction when it has reached the position shown. It should be noted that sheet 132 in this position is held adjacent to second intersection 76, which is the intersection of sheet path 74 and sheet path 46.

Figure 10:
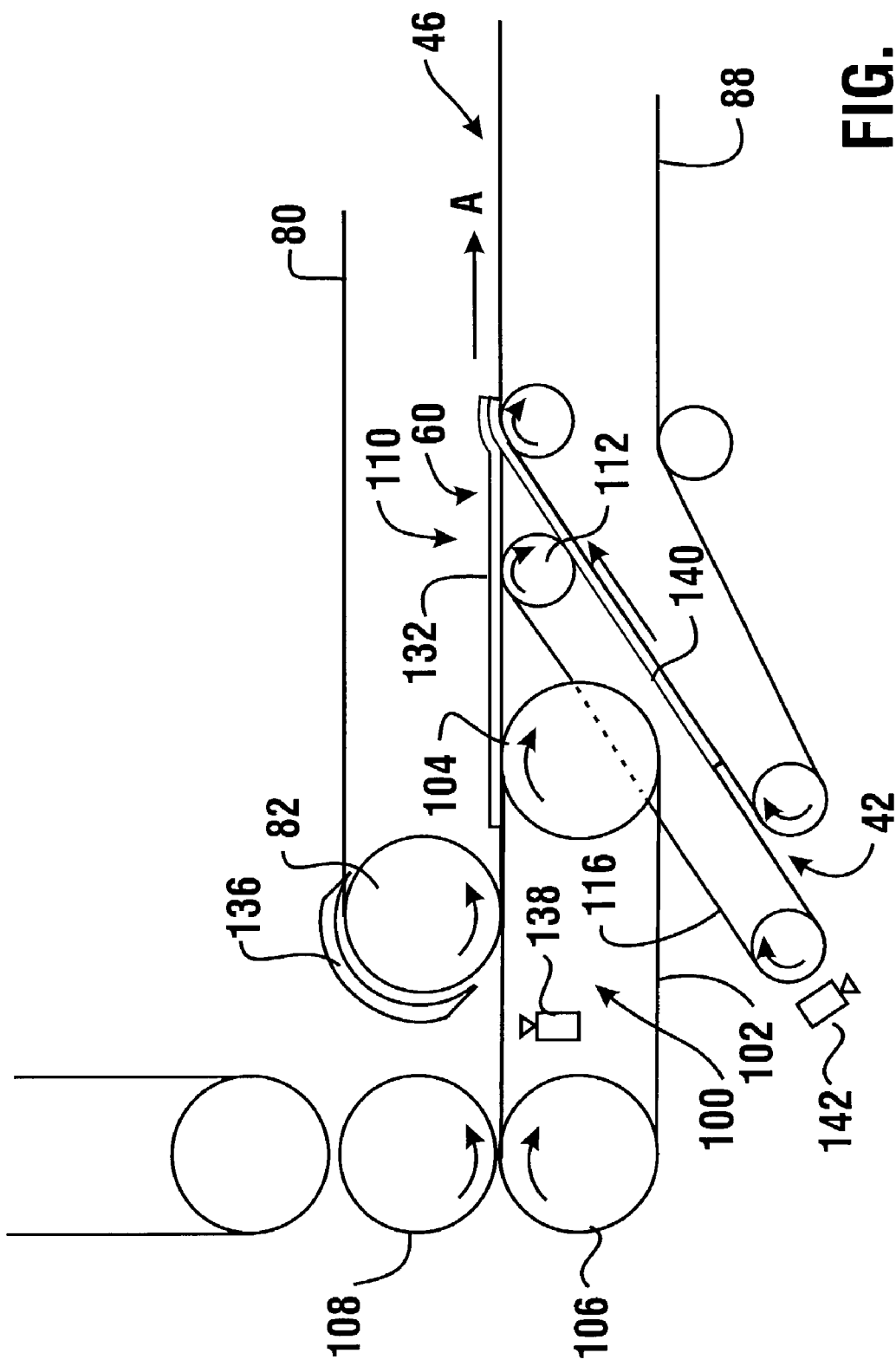
FIG. 10 is a view similar to FIG. 9 with the sheet moving in the intersection and engaging a second sheet being delivered through the second transport path, the second sheet engaging in aligned relation with the first sheet to form a stack.

The next step in the operation of the exemplary stack assembly mechanism is represented in FIG. 10. A further sheet 140 is moved in transport path 42 toward the intersection 60. Sheet 140 may be dispensed by one of the sheet dispensing devices, sheet producing devices or is otherwise in the path, and is moved toward the intersection. As sheet 140 moves adjacent to the intersection it is engaged by the belts 116 of sheet directing apparatus 110 as well as belts 88. Sheet 140 is also sensed by a sensor 142 in transport path 42. Sensor 142 is in operative connection with the control circuitry. The control circuitry operates to accurately coordinate the movement of the sheet 140 in engagement with the sheet directing apparatus 110 and belts 88.

As sheet 140 moves toward the intersection 60 the control circuitry operates to begin moving sheet 132 in the first direction along path 46 toward the intersection. The control circuitry coordinates the operation of the drives for the various components so that sheet 140 and sheet 132 pass through the intersection 60 in coordinated relation. As a result, sheets 132 and 140 engage in aligned, abutting relation so as to form a stack as they move through the intersection 60.

Figure 11:
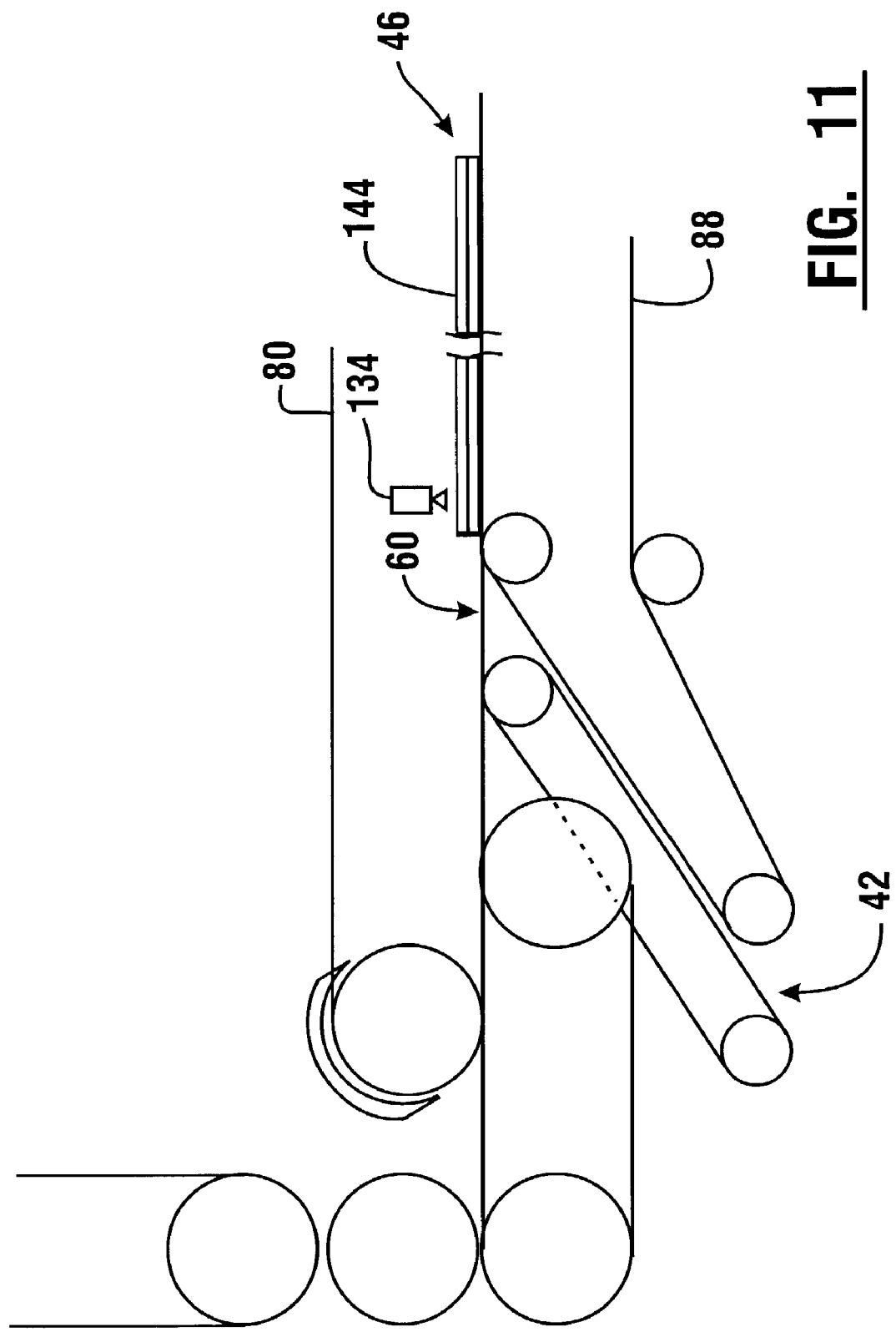
FIG. 11 is a schematic view similar to FIG. 10 in which the stacked pair of sheets have passed through the intersection.

As shown in FIG. 11 once sheets 140 and 132 have passed intersection 60 in the first direction, they are in a stack generally indicated 144. As schematically indicated in FIG. 11, in this mode of operation sensor 144 is operative to sense passage of the stack through the intersection and the control circuitry is operative to stop movement of the stack in the first direction in response to signals from the sensor. After sheets 132 and 140 have combined to form stack 144, additional sheets may be added to the stack. This is accomplished by moving the stack 144 in the second direction similar to that which is done with sheet 132 previously, as represented in FIG. 8. Stack 144 is moved to the position shown in FIG. 12 in which it is held by the holding device formed by holding rolls 108 and transport section 100. Thereafter, additional sheets may be added to the stack by passing sheets on transport path 42 and engaging such sheets in aligned relation with the stack in a manner similar to that represented in FIG. 10.

It will be appreciated that a stack comprising a significant number of generally aligned and abutting sheets may be formed in the manner described. Because the sheets are selectively dispensed from the dispensing devices and/or sheet producing devices adjacent to transport path 42, the sheets may be stacked in a desired order as determined by the control circuitry. For example, sheets which are currency notes may be stacked in order from highest to lowest denomination, or vice versa. Particular sheets may be placed in a desired location within the stack. Once the stack has been assembled in the desired manner by the control circuitry of the machine, it may be moved in first transport path 46 to the opening 20 so it may be taken by a customer.

Figure 12:
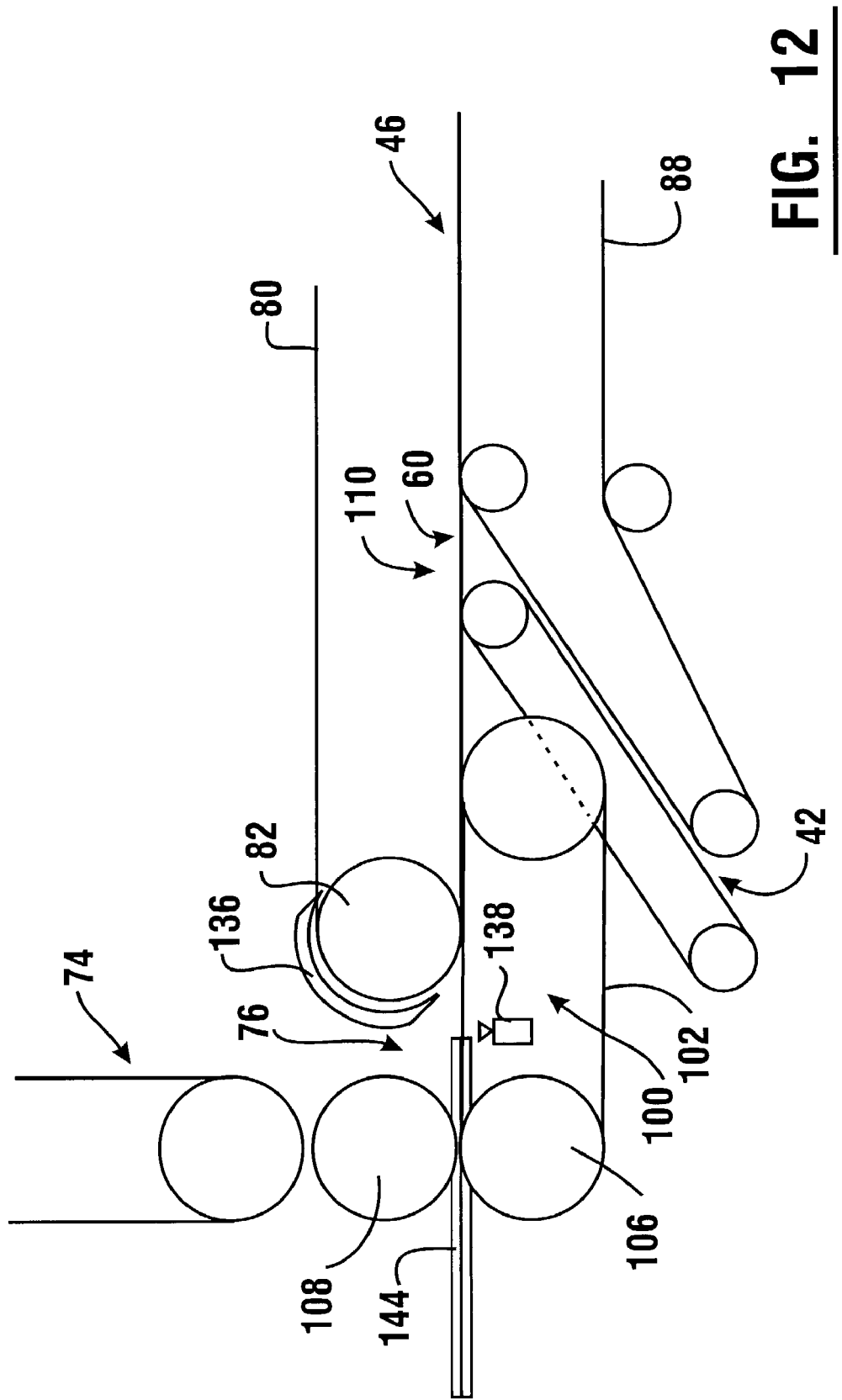
FIG. 12 is a schematic view similar to FIG. 11 in which the stacked sheets are held in the holding device.

It should also be noted that in the position of stack 144 shown in FIG. 12, the stack is positioned in the holding device formed by holding rolls 108 and transport section 100 adjacent to intersection 76. Intersection 76 is the intersection of transport path 46 and transport path 74. Transport path 74 extends to the devices housed in the upper enclosure portion 26 of machine 10.

Figure 16:
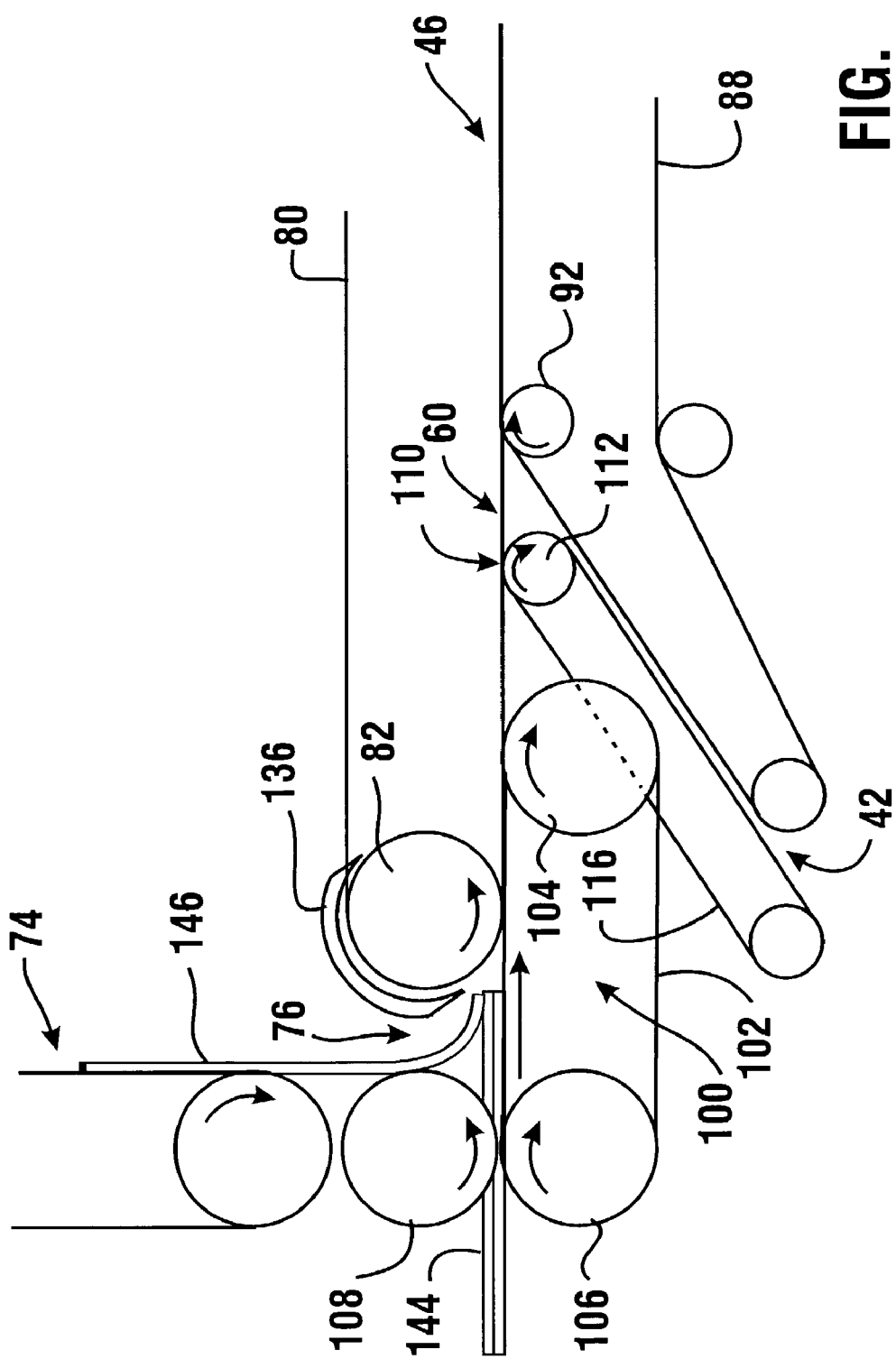
FIG. 16 is a schematic view showing a sheet passing through a second intersection between the first transport path and a third transport path.

As schematically represented in FIG. 16, a sheet 146 may be moved from one of the devices adjacent to sheet path 74 to engage the stack 144 at intersection 76 as the stack moves in the first direction. This enables adding sheets to the stack which are housed in the sheet dispensing devices and/or document producing devices adjacent to sheet path 74. The stack formed by the addition of sheets from sheet path 74 may be moved through sheet path 46 to the customer.

It will be understood that sheets from sheet path 74 may be delivered individually through intersection 76 into sheet path 46, and may thereafter be added to a stack formed at intersection 60 in a manner similar to that previously described. It should also be understood that sheet path 74 includes appropriate sensors that are operatively connected to the control circuitry. The control circuitry operates so that sheets from the sheet path 74 may be added to a stack in engaged, aligned relation with the other sheets in the stack as the sheets pass through intersection 76. As a result the associated structures operate as a further stack assembly mechanism.

Figure 15:
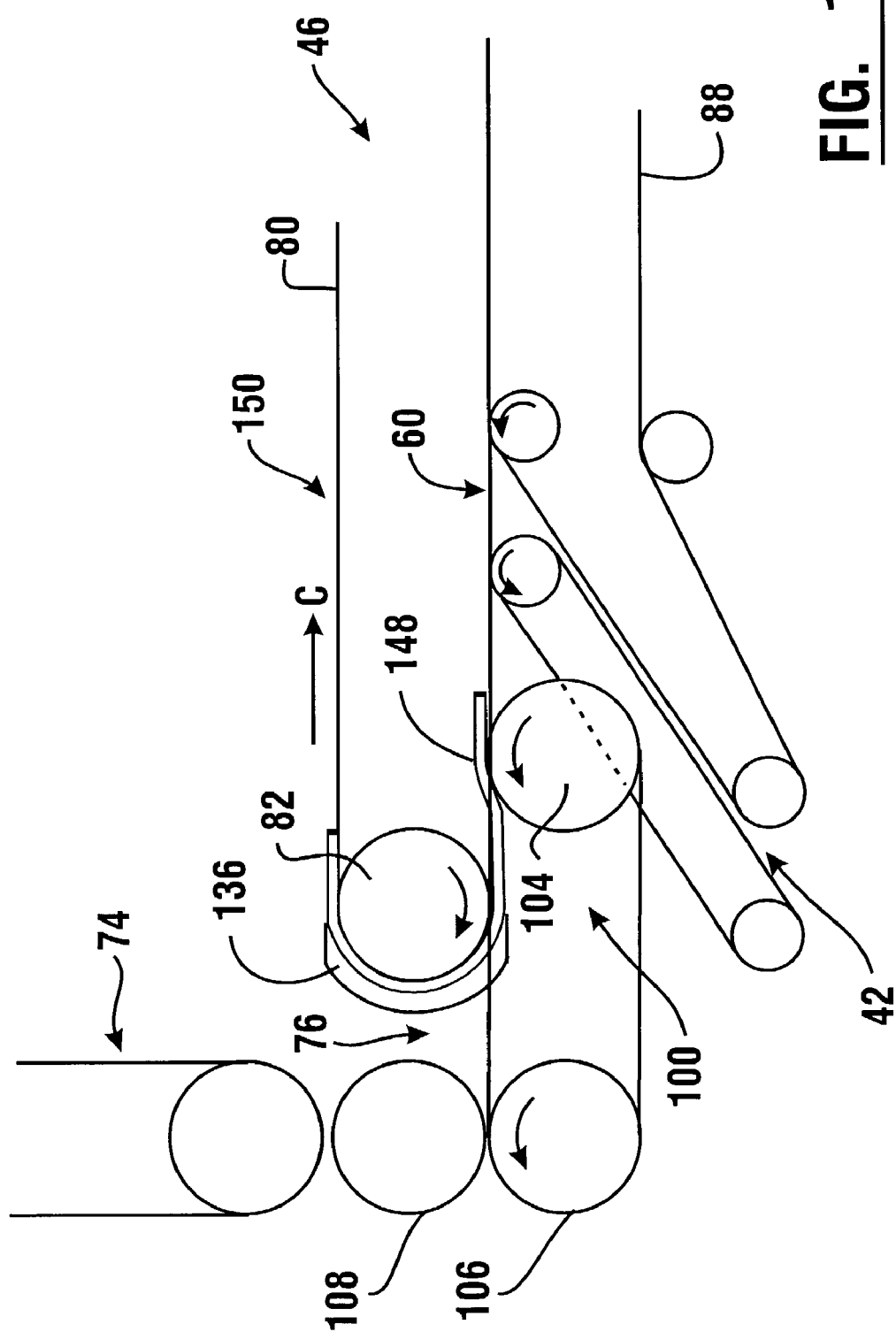
FIG. 15 is a schematic view of the first and second transport paths showing a sheet being reoriented by a sheet turnover device.

As shown in FIG. 15, exemplary machine 10 further includes the capability of taking sheets in the first sheet path and turning them over using a turnover device. This may be done as shown in FIG. 15, through the use of sheet turnover member 136. Exemplary sheet turnover member 136 comprises a member including arcuate guides or tines conforming to the contour of rolls 82. When the turnover member is positioned adjacent to rolls 82, such as in FIG. 15, a moving sheet 148 is caused to be turned over from the position of the sheet in the first sheet path 46. This is accomplished by moving sheet 148 in the direction of Arrow C in FIG. 15. In the exemplary embodiment the upper belt flights of belt 80 are part of a sheet path generally indicated 150. Sheet path 150 extends adjacent to printing device 70 and imaging device 72 shown in FIG. 3. As a result, the sheet may be selectively moved into sheet path 150 for purposes of conducting printing or marking thereon, such as by a marking or cancellation device, for producing an electronic image of the sheet by an imaging device, or both. Of course other or different functions may be performed including devices for making a permanent mark or a removable mark on documents.

Once the marking, printing or imaging activity has been conducted on the sheet in sheet path 150, the sheet may be returned to the first sheet path 46. Once the sheet 148 is returned to the first sheet path it may be selectively moved to one of the other sheet paths 42 or 74. From these sheet paths it may be directed into and stored in an appropriate sheet storage device or location in the machine. Alternatively, sheet 148 may be selectively moved to be combined in a stack with other sheets at intersections 60 or 76. This may in some embodiments provide for the delivery of cancelled checks to a user. Such cancelled checks may be delivered in a stack with other checks, receipts, notes or other documents.

In some embodiments the sheet turnover members 136 may be configured so that sheets in transport path 150 may be directly added to a stack of sheets at the intersection of sheet path 46 and the turnover device. This is accomplished by configuring or moving the turnover member so that the tines in the lower position do not interfere with the passage of a stack of sheets in the first direction past the turnover member. This feature provides yet another stack assembly mechanism and may be particularly advantageous when a customer receipt is printed on a sheet by the printer in sheet path 150, and it is desired to have the receipt at the top of the stack. This may be achieved by positioning the stack in the holding device formed by holding rolls 108 and transport section 100, and moving the stack in the first direction to the right in FIG. 15 as the printed receipt sheet is engaged in aligned relation with the top of the stack as the stack moves toward opening 20.

It should be understood that in other embodiments, sheets from paths 74 and 42, as well as from path 150, may all be added to a stack as the stack moves from the holding device provided by transport section 100 and holding rolls 108, in the first direction toward the customer. This can be readily envisioned from the schematic view shown in FIG. 16 with the stack 144 moving to the right as shown, and sheets being added to the stack as the stack passes roll 82 and again as the stack moves through intersection 60. As will be appreciated by those skilled in the art, numerous configurations and operations of the system may be provided depending on the functions carried out by the machine as well as the programming and configuration of the control circuitry.

Figure 18:
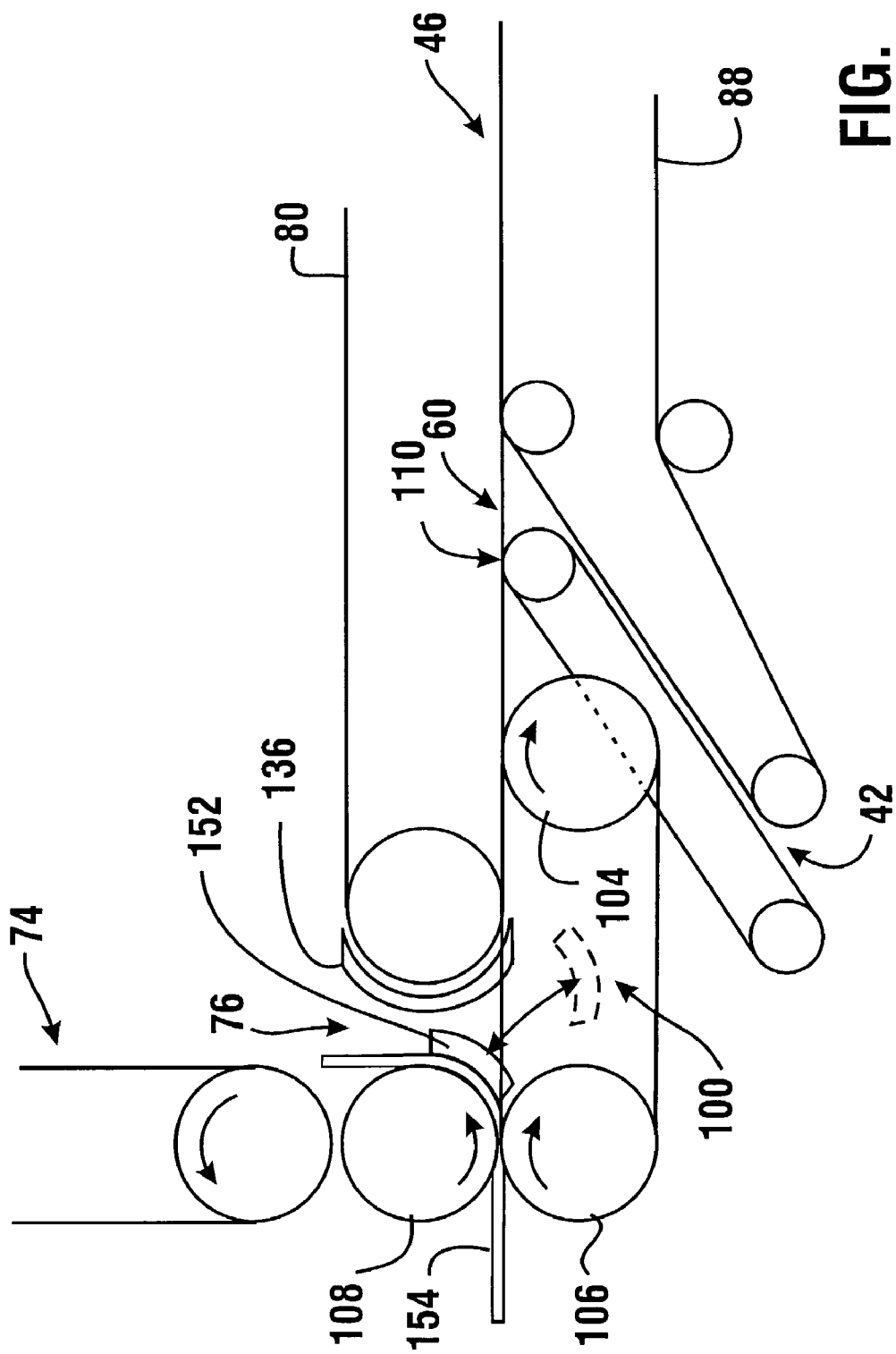
FIG. 18 is a schematic view showing the first, second and third transport paths, with a sheet moving from the holding device to the third transport path.

It should be understood that other sheet turnover devices, other than, or in addition to turnover member 136, may be provided in other embodiments. For example, in FIG. 18 a directing member 152 is shown in cooperating relation with roll 108. Directing member 152 is selectively movable between the position shown, wherein it is adjacent to roll 108 and the position shown in phantom. As represented in FIG. 18, when the directing member 152 is in the position shown it is operative to direct a sheet 154 that is held in the holding device formed by transport section 110 and holding rolls 108 into transport path 74. Sheet 154 may be moved in transport path 74 to a sheet handling device for storage therein in the manner previously discussed.

Alternatively, turnover of the sheet 154 may be accomplished by moving it into transport path 174 and thereafter disposing directing member 152 away from roll 108. Once this is done, sheet 154 may again be directed into path 146 and moved to the right as shown in FIG. 18 so that sheet 154 will move in a manner comparable to that of sheet 146 shown in FIG. 16. This will result in the orientation of sheet 154 being reversed in sheet path 46 from its original orientation.

The components adjacent to intersection 60 may also be operated as a sheet turnover device. This is represented schematically in FIG. 20. This is accomplished by having a sheet 156 initially positioned in the first sheet path similar to sheet 132 in FIG. 7. The sheet is then moved into the second sheet path at intersection 60 by operating the sheet directing apparatus 110 in a manner that is later discussed in detail. Once sheet 156 is in the second sheet path, the direction of belts 88 and 116 is reversed while the lower flights of belt 80 are moved to move the sheet in the second direction indicated by Arrow B. This results in the sheet being turned over from its original orientation in the transport.

Figure 20:
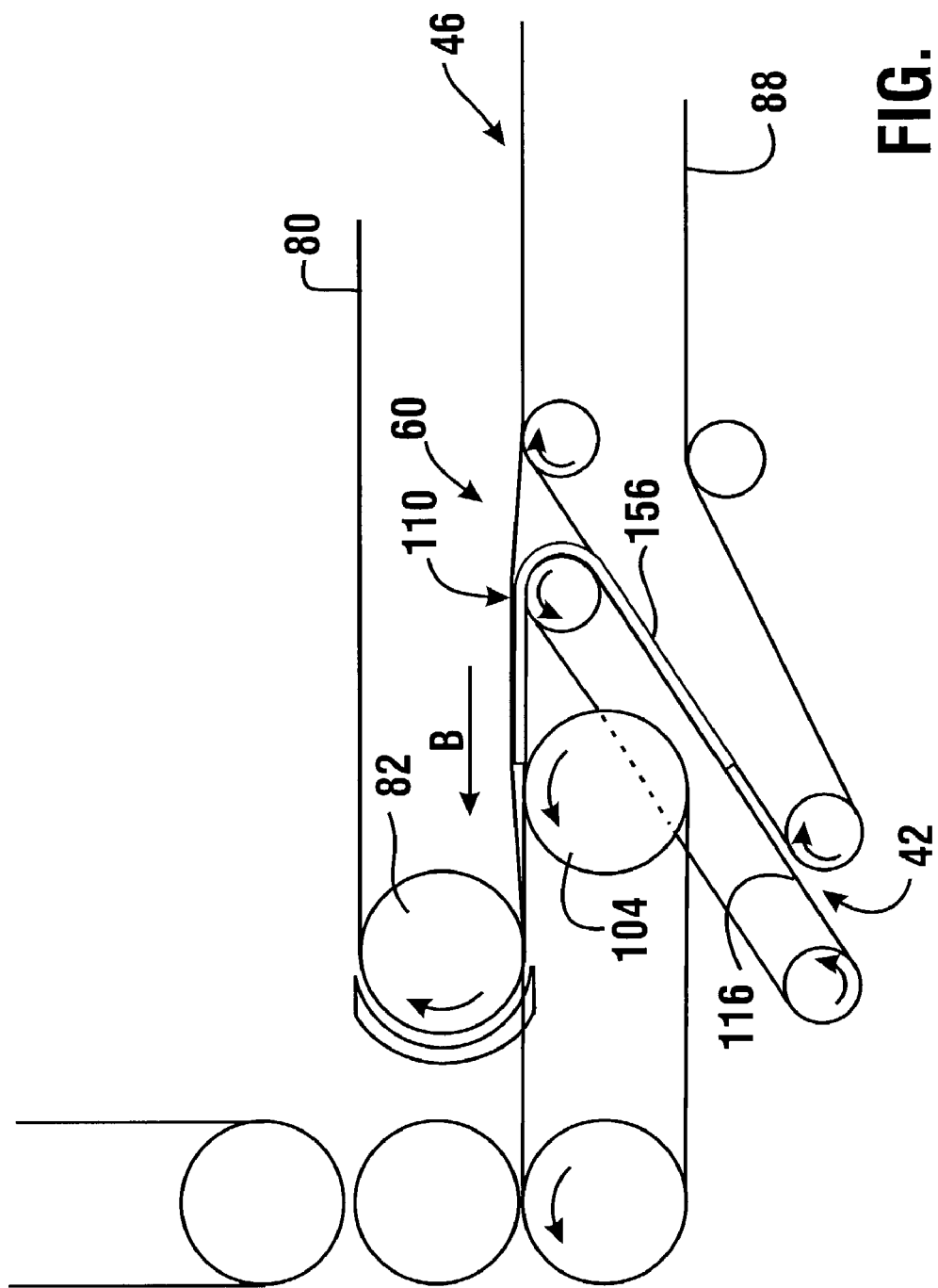
FIG. 20 is a schematic view showing the first and second transport paths with a sheet moving from the second transport path to the first transport path, and schematically demonstrating how the sheet directing apparatus is used as part of a sheet turnover device.

It should be further understood that sheets which originate in transport path 42 may also be directed in the manner shown in FIG. 20. This feature enables selectively positioning sheets and turning them over through a number of different mechanisms. This enhances the capabilities of the exemplary automated banking machine.

Figure 13:
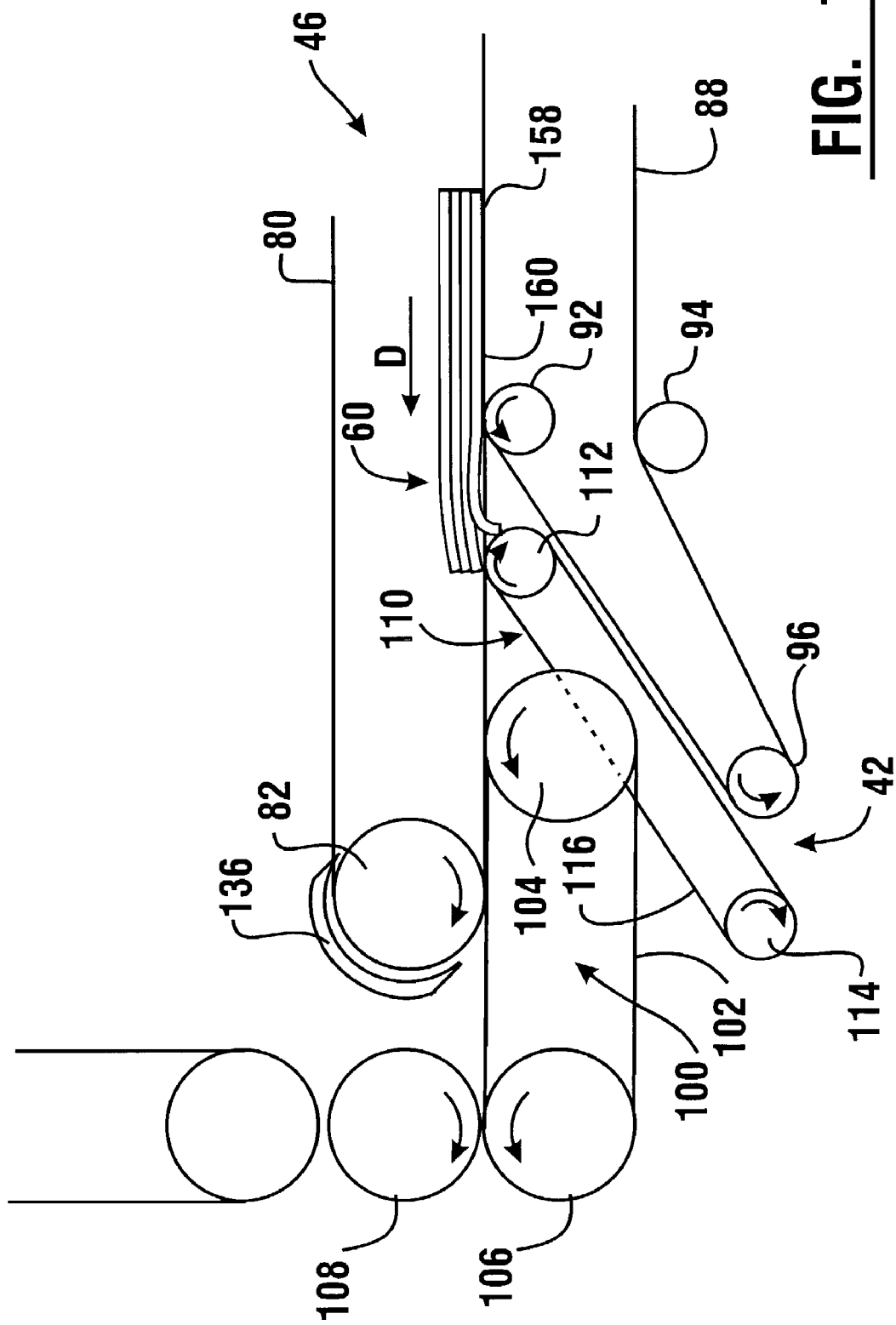
FIG. 13 is a schematic view of the first and second transport paths with the sheet directing apparatus operating to separate a first sheet from a stack as the stack passes through the intersection.
Figure 14:
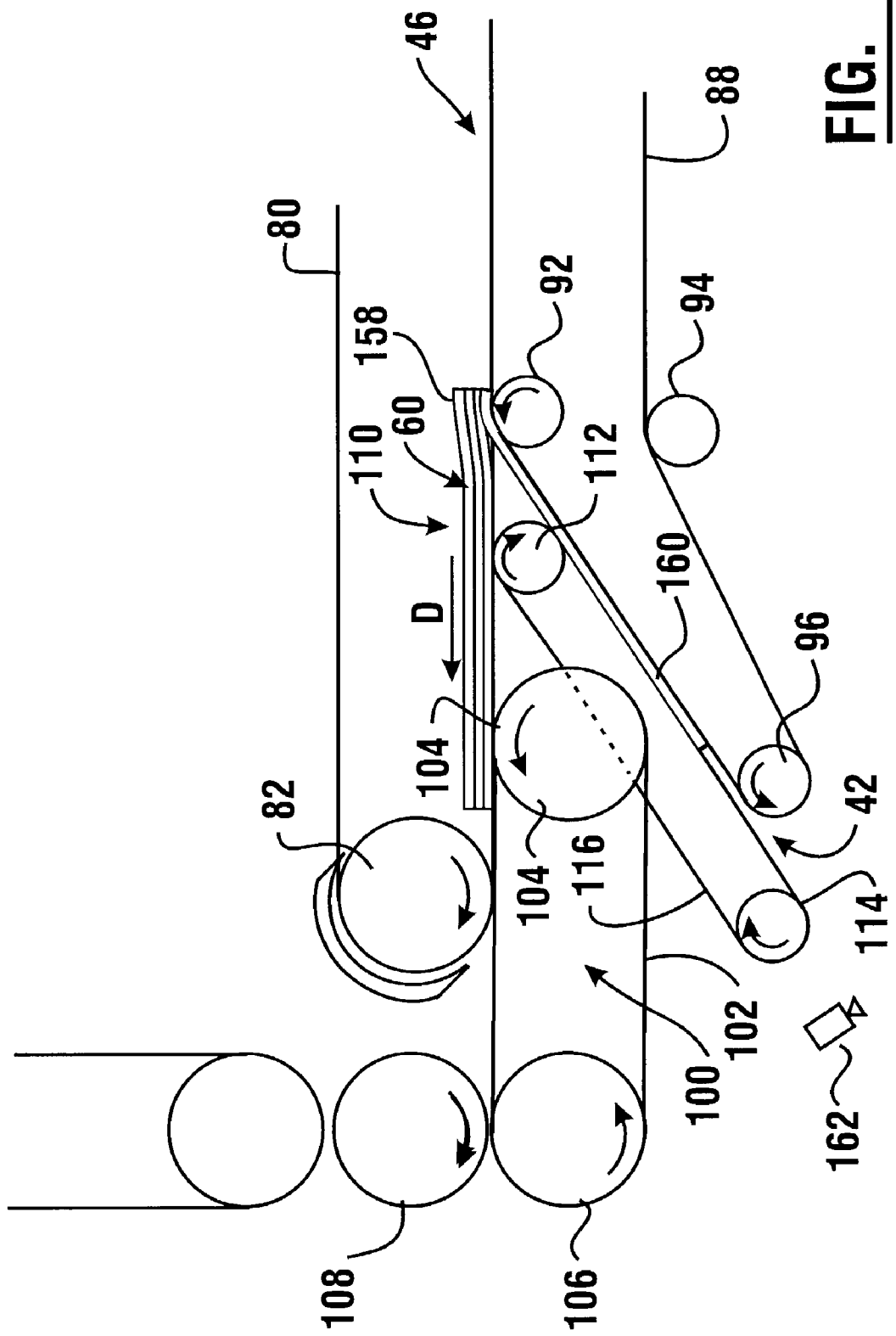
FIG. 14 is a schematic view similar to FIG. 13 showing the sheet separating from the stack as the stack passes through the intersection.

A further useful aspect of the exemplary embodiment is that it includes a separating mechanism for separating sheets from a stack as represented schematically in FIGS. 13 and 14. The exemplary embodiment shown includes the capability of selectively separating a sheet from a stack of sheets as the stack passes through the intersection 60 of transport path 46 and transport path 42. As schematically represented in FIG. 13, a stack of sheets 158 moves in the direction indicated by Arrow B in transport path 46. Although stack 158 is shown as a stack of four sheets, it should be understood that the stack may comprise a greater or lesser number of sheets. Stack 158 may be a stack of sheets received from a user of the machine through opening 20 and may consist of different sheet types. For example in some embodiments stacks accepted in the machine may include stacks of mixed notes, checks and/or other types of sheets As stack 158 moves toward intersection 60 the control circuitry of the machine operates sheet directing apparatus 110 so that rolls 112 and 114, and belts 116 journaled thereon, move relative to the stack in a direction opposed to the direction of stack movement. As a result of this movement by the sheet directing apparatus, a first sheet 160 which bounds a first side of the stack, is frictionally engaged by belts 116 and is stripped and separated from the stack. The first sheet 160 is directed into the sheet path 42 as the stack which comprises the remaining sheets continues on path 46. This enables sheet 160 to be handled separately by the devices adjacent to path 42, or to be later brought individually back to path 46 for individual transport to devices adjacent to other paths.

It should be noted that the sheet handling stacking and unstacking mechanisms described in the exemplary embodiment are but examples of devices for handling documents such as notes, checks, or other sheets within an automated banking machine. In other embodiments other sheet handing and transport mechanisms may be used.

It should be noted that in the exemplary embodiment a sensor 162 is positioned adjacent to path 42. Sensor 162 may be a photo electric sensor connected to the control circuitry for sensing the position of the sheet. Alternatively, sensor 162 may comprise a plurality of similar or different sensors adapted for sensing features of a sheet. Sensor 162 may be part of a validation or accessing device such as that previously discussed that is suitable for determining note type and denomination. This enables the control circuitry to properly identify a currency sheet and place it in a designated note handling mechanism, storage position or other the sheet receiving device. Sensors 162 may alternatively operate in connection with the control circuitry or other circuitry to provide a validation mechanism or assessing device to determine or assess the genuineness of a sheet. In other embodiments other features such as magnetic ink indicia, bar coding and other features may additionally or alternatively be detected by one or more sensors for purposes of identifying the type, nature an/or properties of a sheet as it moves adjacent the sensors.

As previously mentioned, in some embodiments the validation device may be operative to identify particular sheets, such as by serial number or other characteristics. In some embodiments such information may be stored for suspect notes, and in others for all or certain selected categories of notes. Such data concerning individual notes may be stored in a data store in correlated relation with information usable to determine the identity of the user who provided the note to the machine. Other data may be stored as well, such as for example, the storage location or position where the note is stored in the machine or other information that can be used to recover the particular note and/or to document the transaction.

In some embodiments the machine may hold in a data store, identifying information related to notes for purposes of comparison to notes provided to the machine. This may include in some embodiments information corresponding to properties, characteristics or numbers associated with known counterfeit or invalid notes. Such information used for comparison may also include identifying data for individual notes already deposited in the machine. Thus for example, if a note provided to the machine is individually identified by determining the serial number, the serial number may be compared through operation of the control circuitry to stored data for serial numbers of known counterfeits. Alternatively or in addition, the serial number of the note provided to the ATM may be compared to serial numbers for notes previously deposited or input in the machine. In the event of a match in either example the control circuitry would act in response to the apparent suspect note in accordance with its programming. This may include capturing and storing the suspect note, marking the note, capturing additional data about the user presenting the suspect note, notifying authorities or taking other action.

In embodiments where identifying data on all notes is captured and used for comparison, the control circuitry may operate to indicate when the note has been dispensed out of the machine. This may include for example deleting the information about the note such as its serial number from the data store upon dispense. Alternatively such indication may include storing the information indicative that the particular note has been dispensed. The information about the note dispensed may in some embodiments be stored in correlated relation with information unable to identify the user who received the note from the machine. Of course other approaches may be used in other embodiments and the approaches discussed with regard to notes may also be applied to other types of documents.

Returning to the discussion of the operation of the separating mechanism, after sheet 160 is separated from the stack 158 as shown in FIG. 14, the control circuitry may operate the transports in the first path 46 to move the remaining stack to a position to the right of the intersection 60. If it is desired to separate an additional sheet from the stack, the remaining sheets may be moved through the intersection again in the direction of Arrow D to accomplish separation of the sheet that is newly bounding the side of the stack. Alternatively, if the control circuitry determines that it is not necessary to separate a further sheet from the stack, the sheet directing apparatus may be operated so that belts 116 and rollers 112 and 114, move in the same direction as rollers 92 and at a similar speed. This will result in the stack passing through the intersection without a sheet being separated from the stack.

It should be understood that while in the embodiment shown the sheet directing apparatus comprises a plurality of rolls having resilient surfaces thereon that move at a relative speed that is less than the speed of the moving stack, in other embodiments other types of stripping and separating devices may be used. These may include for example, resilient pads or rolls. Such devices may also include resilient suction cup type mechanisms or vacuum generating devices. Further alternative forms of sheet directing devices may include other physical members that engage selectively one or more sheets so as to direct them from path 46 into another path 42.

Figure 23:
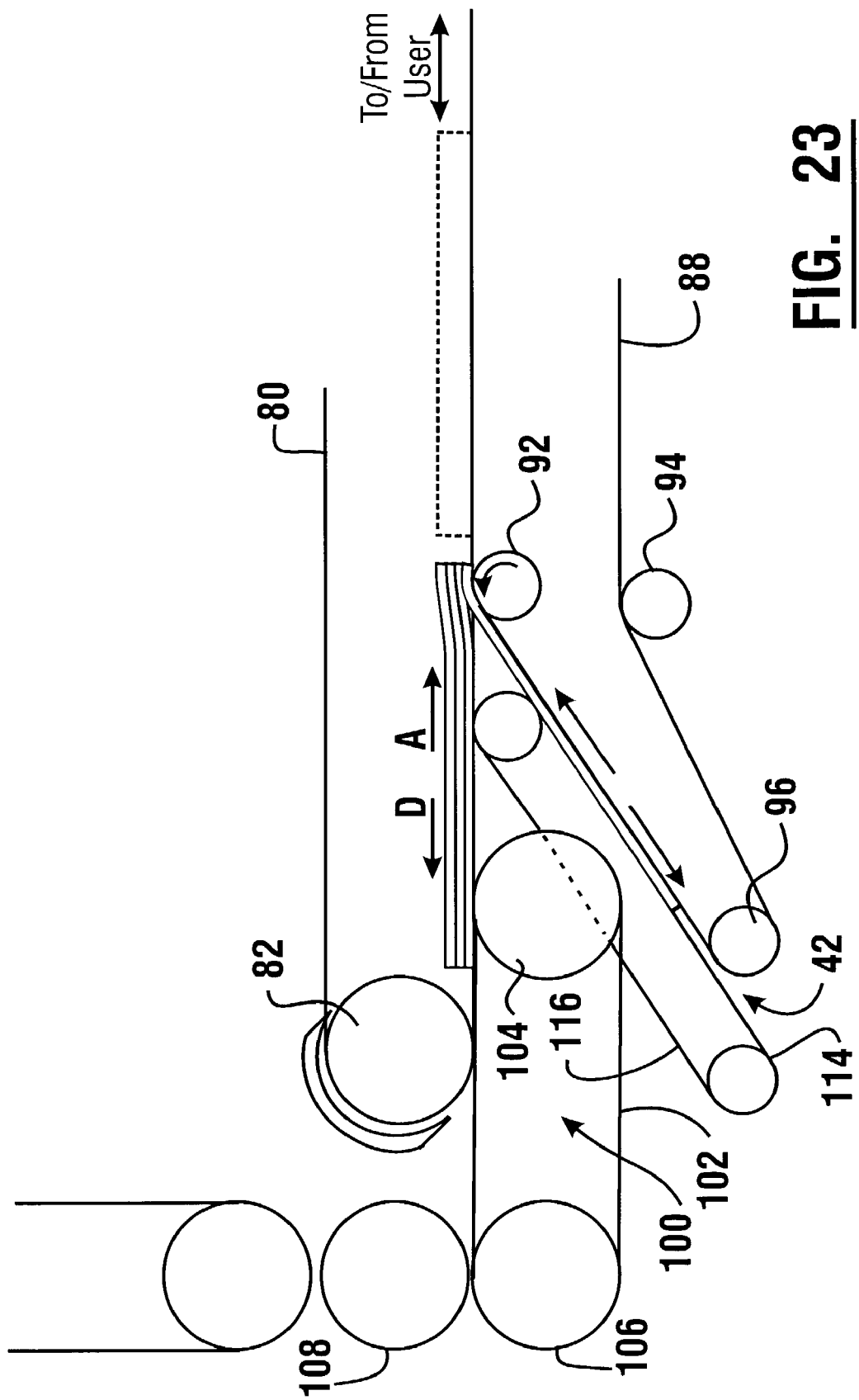
FIG. 23 is a schematic view showing a sheet separating from or adding to a stack as the stack passes through an intersection.

It should also be noted that in the exemplary embodiment shown in FIGS. 13, 14 and 23, sheets may be separated from a stack as the stack moves from right to left. However, in other embodiments it may be desirable to arrange the sheet directing apparatus so that sheets may be separated from a stack when the stack moves in either direction. This may be readily accomplished through arrangements of resilient rollers or other stripping devices or members which may be selectively actuated to engage and separate a sheet upon passage of a stack through an intersection. This configuration may have advantages in other embodiments where greater speed in sheet separation is desired.

As will be appreciated from the foregoing discussion, in some banking machines it may be desirable to process certain sheets individually. For example, if it is determined that a sheet separated from a stack is a check or other negotiable instrument that must be transferred to the imaging device, or an invalid note or note of questionable validity that should be transported to a marking device, it may be desirable to clear a path which enables the sheet requiring such handling to be transported individually. This can be accomplished by disposing the stack of sheets that are not currently being processed individually away from the single sheet in first path 46. In this manner the sheet requiring individual handling can be transferred to path 150 or such other location as may be necessary without causing the remaining stack to undergo transport to an undesirable location.

Figure 19:
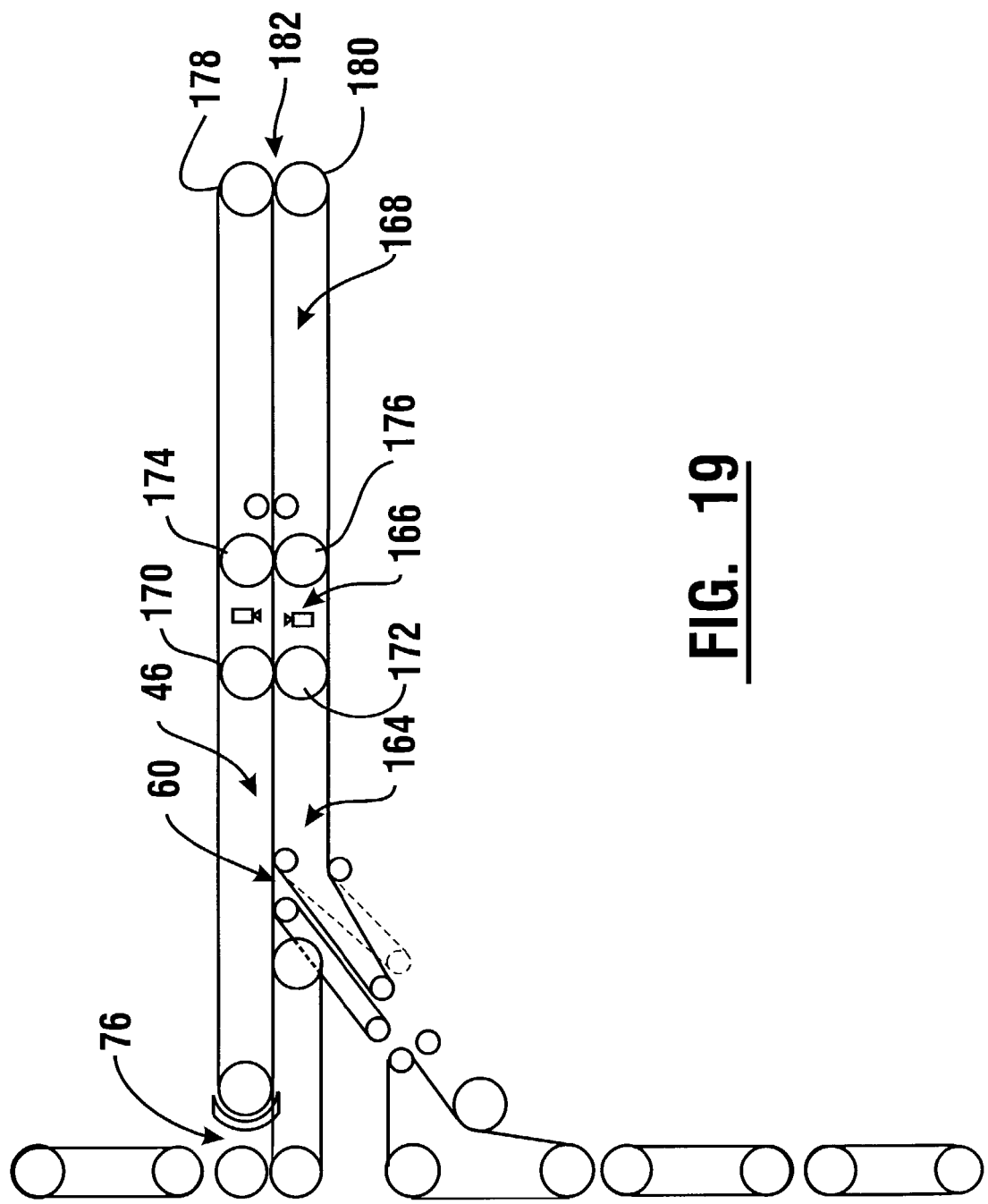
FIG. 19 is a schematic view of an alternative embodiment of the first, second and third transport paths with additional holding devices in the first transport path.

A further alternative to facilitate individual handling of particular sheets is represented by the alternative embodiment shown in FIG. 19. In this embodiment path 46 includes three separately controlled transport sections 164, 166 and 168. Transport section 164 is similar to the transport previously discussed, except that its belts terminate at rolls 170 and 172. Transport section 166 may include an interwoven belt transport similar to that shown in FIG. 5 with the exception that its belts are offset from those in transport section 164. Transport section 166 may be driven by one or more independent reversible drives from transport section 164. The drive for transport section 166 is in operative connection with and operates under the control of the control circuitry.

Transport section 166 terminates in rolls 174 and 176. Rolls 174 and 176 are coaxial with other rolls that are spaced intermediate thereto that are part of transport section 168. Transport section 168 terminates at rolls 178 and 180 which are adjacent to a customer accessible opening indicated 182. Transport section 168 is operated by at least one independent reversible drive in response to the control circuitry.

Transport sections 166 and 168 along path 46 provide locations in which documents or stacks of documents may be temporarily stored as other documents are routed through intersections 60 and 76. After the necessary processing is done on the individual documents, the documents that are temporarily stored in the transport sections 166 and 168 may be moved to other transport sections for further processing. It should be understood that transport sections 166 and 168 include appropriate sensors for sensing the positions of the documents being temporarily stored therein which enables the control circuitry to coordinate movement thereof.

Figure 17:
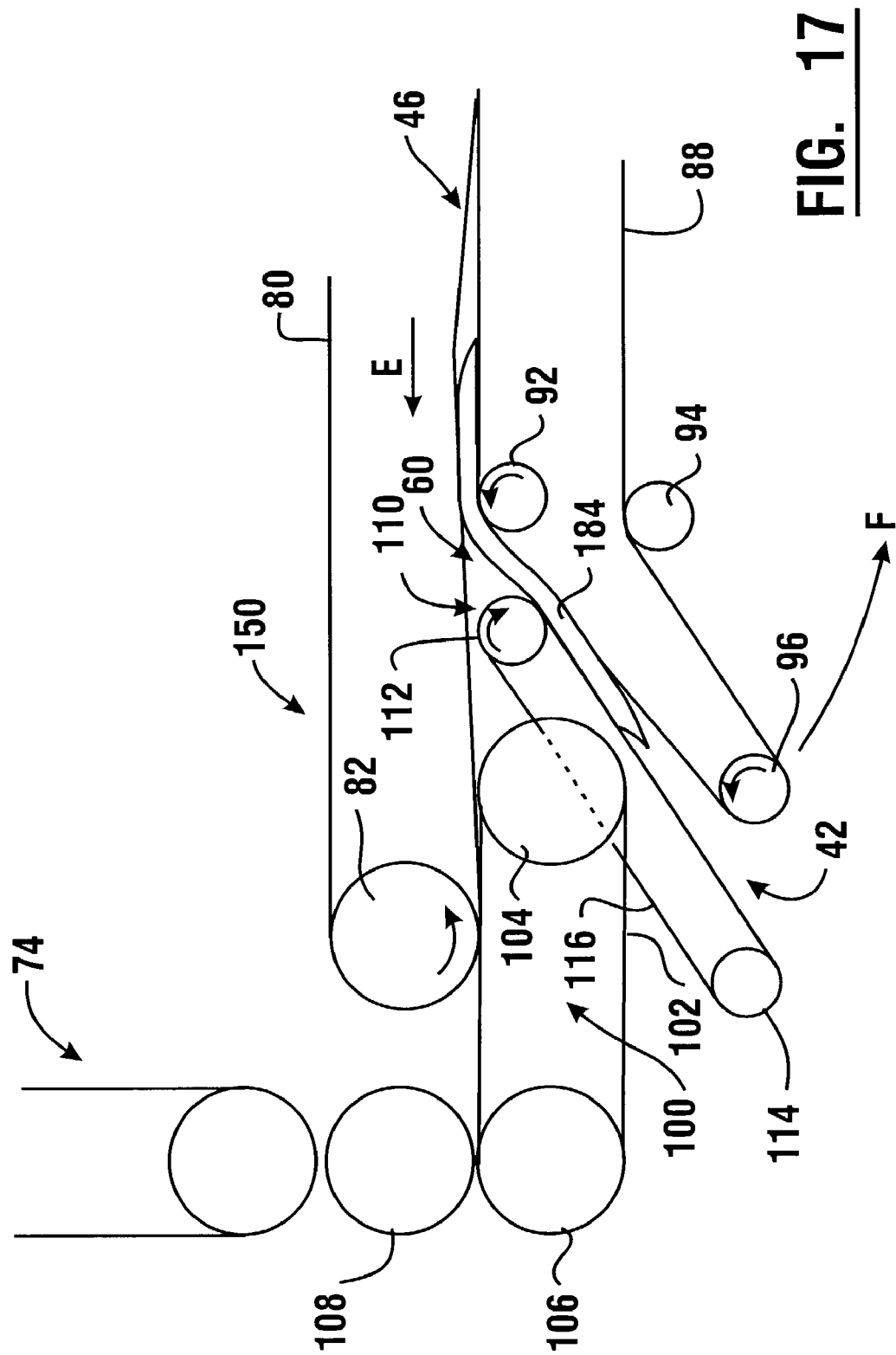
FIG. 17 is a schematic view of the first and second transport paths with a deposit envelope passing therethrough.

A further advantage of the exemplary embodiment described herein is that not only may the automated banking machine 10 accept individual documents and stacks of documents from a customer, but it may also accept conventional deposit envelopes. As shown in FIG. 17 a thick sheet like deposit envelope 184 may be moved along path 46 from a customer. The identification of the deposited item as a deposit envelope may be made based on readings from sensors 126, 128 or 130 as shown in FIG. 4, or alternatively or in addition based on customer inputs through one or more input devices at the customer interface 12 of the machine.

Deposit envelope 184 moves in transport path 46 in the direction of Arrow E as shown in FIG. 17. Upon determining that the item moving in the transport path is a deposit envelope, the control circuitry operates the sheet directing apparatus 110 to direct the envelope into transport path 42. The control circuitry also enables roll 96 and belts 88 to move in the direction indicated by Arrow F. This causes the flight of belt 88 to move to the position shown in phantom in FIG. 4. This enables the envelope to move into the depository device 40 (see FIG. 3) in which it may be stacked in aligned relation with other envelopes. Further the control circuitry may also operate transport 118 and rolls 124 shown in FIG. 4 to assure that envelope 184 does not pass further along sheet transport path 42 than the depository 40.

The ability of the embodiment of the automated banking machine to handle depository envelopes, stacks of sheets and individual sheets, provides enhanced functionality for the machine. The ability of the exemplary embodiment to accept thick items in the area of path 42 adjacent to the intersection, also enables the control circuitry to use the area adjacent to the intersection as a temporary storage location for stacks of sheets. This may be desirable in some embodiments where a receipt form is delivered on transport path 74 and must be directed to transport path 150 for printing thereon before being combined with a stack to be delivered to a customer.

The exemplary embodiment of the ATM has the capability of storing the assembled stack of sheets adjacent to intersection 60 in transport path 42 until such time as the printed receipt is moved into the intersection along first path 46. As the receipt form is produced by a document producing device and moved into the intersection 60 by transport section 100, the stack is moved into the intersection in coordinated relation therewith so that the printed receipt is assembled into the stack and positioned at the top side of the stack. The assembled stack may be moved along transport path 46 to the opening where it may be taken by the customer.

In some embodiments the ATM may also operate to provide certain types of documents in exchange for other documents. As previously discussed, some embodiments may receive checks or other instruments, validate the check, and provide the user with currency notes. In some embodiments, a user may provide notes to the ATM and receive other types of documents such as money orders, scrip, vouchers, gift certificates or bank checks. In some embodiments the control circuitry may operate in the manner previously discussed to store information concerning individual notes in a data store in correlated relation with information usable to identify the user who deposited the notes in the machine. Some embodiments may store in correlated relation with all or a portion of such data, information which identifies the check, money order or other document provided by the machine to the user.

In some embodiments the ability of a single user to provide cash to the ATM may be controlled or limited to avoid money laundering or other suspect activities. For example, a user placing notes in the ATM to purchase money orders or other documents, may be required to provide at least one identifying input. This may include a biometric input such as a thumbprint for example. Such at least one identifying input may include data on a card or other device a user provides to operate the machine, or may be in lieu thereof or in addition thereto. Alternatively, some embodiments may enable use of the ATM to buy documents such as money orders, gift certificates or other documents without using a card or similar device to access the machine. In some cases a user may exchange notes of certain denominations for notes of other denominations. In such cases the control circuitry may require at least one identifying input from the user requesting to exchange cash for other documents.

The control circuitry may operate in accordance with programmed instructions and parameters to limit the number or value of documents a user may purchase or otherwise receive. This may include comparing user identifying data with data input in connection with prior transactions. This may be done by comparing user input data stored in a data store at the particular ATM, and/or data stored in computers connected to the ATM. By limiting the number or value of documents a user can purchase with cash, either overall, for a particular document or within a given time period, the risk of illegal activities such as money laundering can be minimized. Further such systems may more readily enable funds to be tracked.

Figure 22:
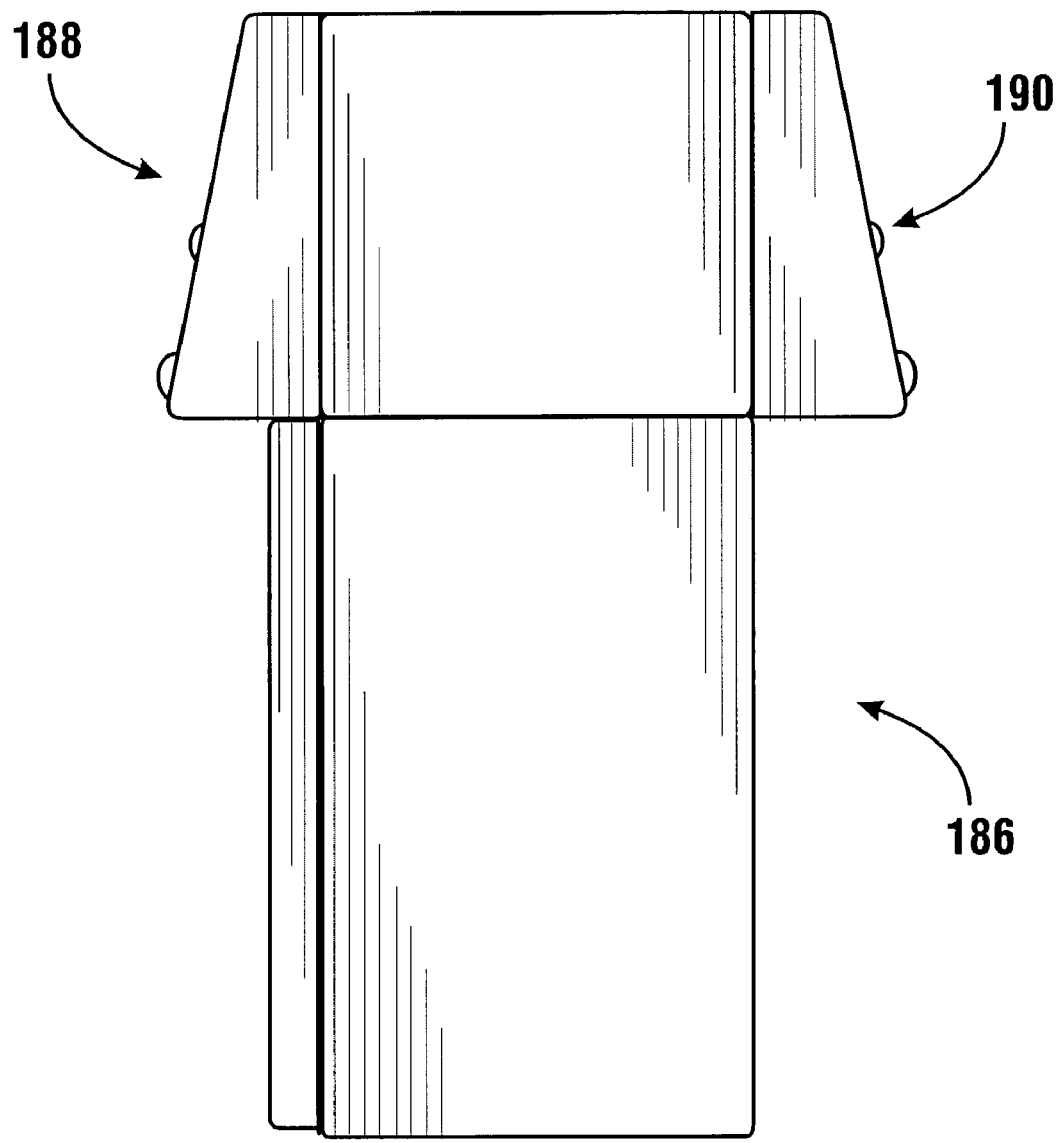
FIG. 22 is a side view of an automated banking machine housing the transport apparatus schematically shown in FIG. 21.

An alternative embodiment of an automated banking machine is indicated 186 in FIG. 22. Machine 186 is similar to machine 10 except that it includes two fascias and customer interfaces designated 188 and 190. Machine 186 is capable of operation by two users generally simultaneously.

Figure 21:
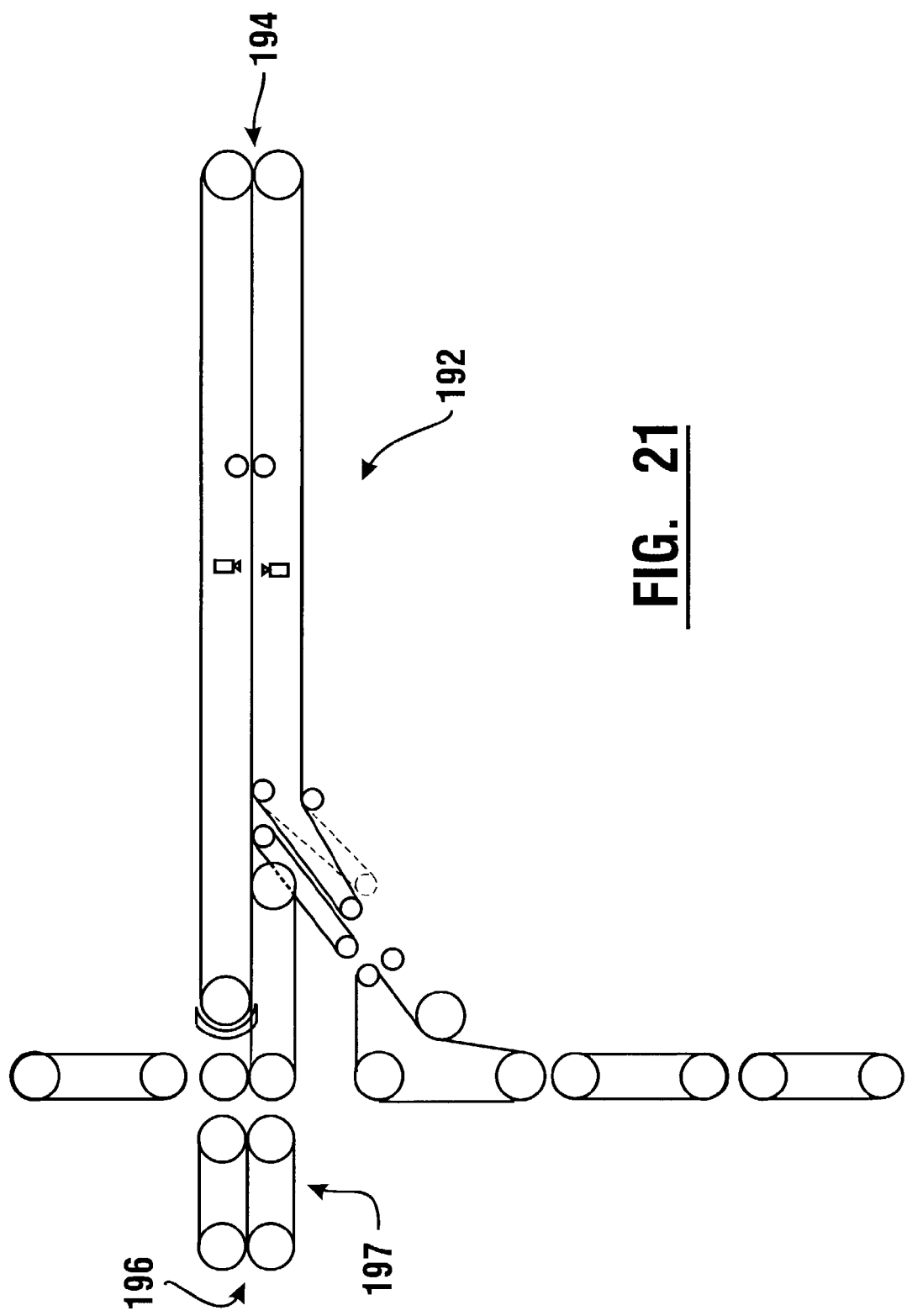
FIG. 21 is a schematic view of an alternative embodiment of the first, second and third transport paths used in an alternative automated banking machine in which two user interfaces and user accessible openings are provided.

The sheet handling mechanism for machine 186 is indicated 192 in FIG. 21. The sheet handling mechanism 192 is similar to that described in the first embodiment, except as otherwise noted. Mechanism 192 includes a first customer accessible opening 194 in customer interface 190, and a second customer accessible opening 196 in customer interface 188. Customer opening 196 receives and delivers sheets through a transport section 197. Transport section 197 is preferably an interwoven belt type transport of the type shown in FIG. 5 and is capable of moving sheets, envelopes and stacks of sheets in engagement therewith. Transport section 197 is operated by a reversible drive similar to the reversible drives used for the other belt transport sections, and is in operative connection with the control circuitry of the machine.

The operation of the alternative sheet handling mechanism 192 is similar to that previously described except that the sheets, envelopes or stacks of sheets that are processed may be received from or delivered to either customer opening 194 or customer opening 196. Because of the high speed capability of the exemplary embodiment, it is possible for the sheet handling mechanism 192 to adequately service two users simultaneously without undue delay.

As will be appreciated from the foregoing description, the modifications necessary for the sheet handling mechanism of the first embodiment to accommodate two simultaneous users is relatively modest. In the exemplary embodiment it is possible to increase the number of customer interfaces on the machine from one to two at a relatively small cost. This is particularly advantageous for an automated teller machine positioned in a high customer traffic area. It is also useful for automated banking machines, such as those used by tellers to count and dispense currency notes. This is because the configuration of the sheet handling mechanism enables two tellers or other personnel to be serviced by a single machine.

Exemplary embodiments may operate to assure operation in accordance with the principles of U.S. Pat. No. 6,315,194, the disclosure of which is incorporated by reference as if fully rewritten herein.

Figure 24:
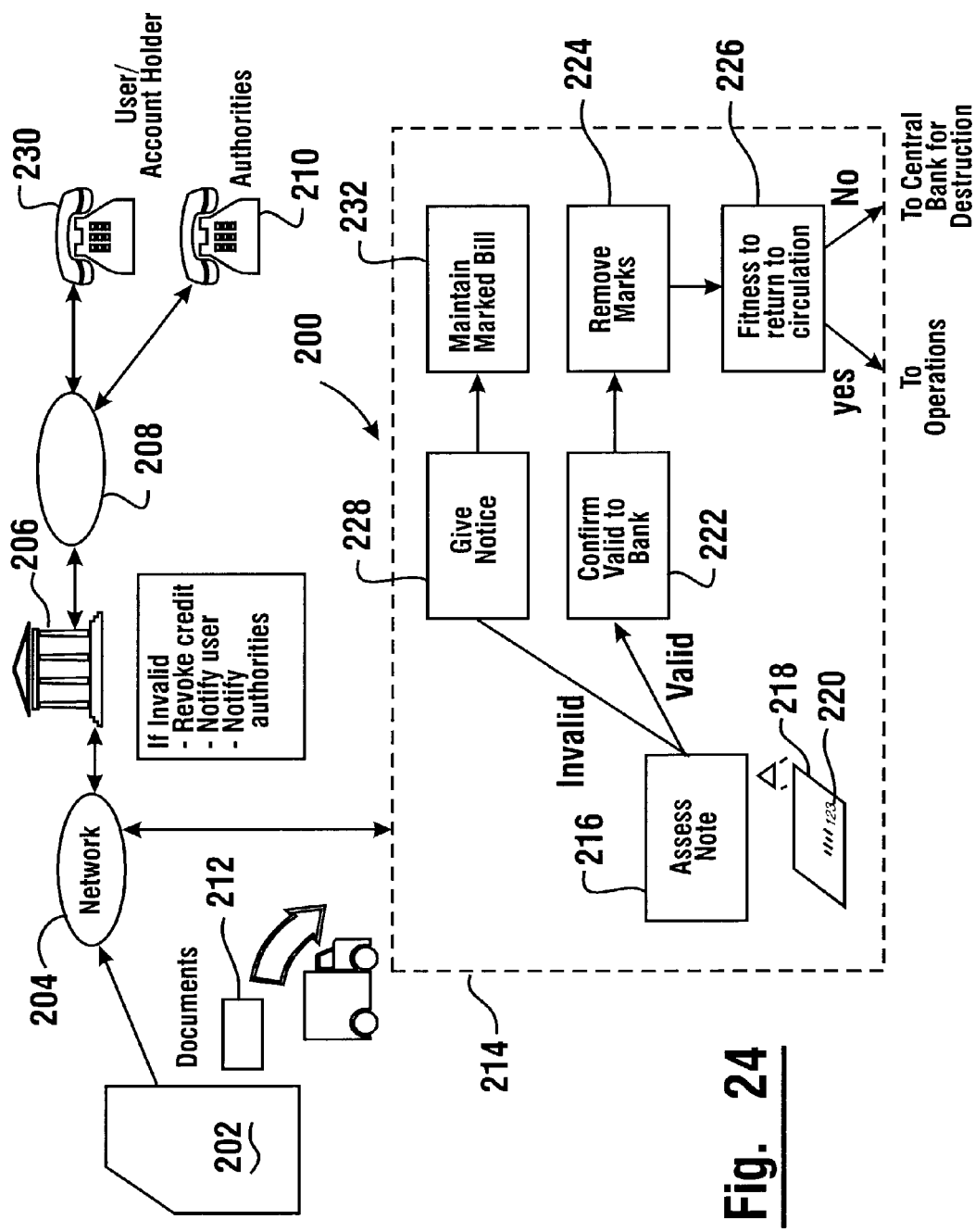
FIG. 24 is a schematic view showing an exemplary system in which suspect and/or invalid documents deposited in an automated banking machine are processed.

FIG. 24 shows schematically an exemplary system 200 and the steps in an associated method for handling documents such as notes of questionable validity or invalid documents or notes that have been received by an automated banking machine 202. Banking machine 202 may be similar to ATMs 10 or 186 previously described or may have a different construction. In the exemplary embodiment the automated banking machine includes an assessing device for assessing the validity of documents such as notes that are deposited by a user into the machine in the course of one or more transactions. The assessing device operates as previously described in connection with a controller, control circuitry or other devices in the machine to identify documents of questionable validity and/or invalid documents.

As can be appreciated from the description herein and the incorporated disclosure, some notes that are deposited in the machine may be determined to be invalid such as a clearly counterfeit note or other document that is not a note. Other documents that are deposited in the machine may be determined through operation of the assessing device to be more likely than not to be valid notes, but which nonetheless do not qualify as documents which the machine accepts as unquestionably valid. Of course it should be appreciated that the determination as to what parameters qualify a particular note or other type of document in the machine as unquestionably valid, of questionable validity or invalid may in some embodiments be set by the operator of the machine and/or by appropriate authorities within the jurisdiction in which the machine is operated.

In an exemplary embodiment the automated banking machine 202 operates to accept documents of questionable validity, but marks such documents with at least one removable mark so that each document may be tracked and later further assessed as valid or invalid. In the exemplary embodiment of the system 200 shown in FIG. 24, the machine 202 communicates through a network 204 with one or more computers which are remotely located. Such remote computers may include computers located at a bank, financial institution or other source of monetary value schematically indicated 206. A user operating the exemplary ATM 202 generally identifies themselves or an account in the manner previously discussed and conducts transactions which may include presenting or receiving documents such as notes. When a user conducts a transaction on an account, the ATM 202 communicates messages through the network 204 to one or more bank computers 206 to authorize and record the transaction. Such transactions generally have associated indicia which is stored at the ATM, the bank or other computers in the network, for purposes of documenting the transaction and settling accounts between users, machine operators, banks and other entities that may be involved in transactions that are conducted. One or more indicators which may be associated with a transaction may include a unique transaction number associated with a particular transaction in which a document is presented. The transaction number may correspond to a transaction at a particular date, time, and ATM. Alternatively or in addition an indicator associated with the transaction may include information on the account of the user or other entity on whose behalf the transaction is conducted. Alternatively or in addition an indicator associated with the transaction may include biometric or other data concerning the particular individual conducting the transaction or having the account. Of course indicators may comprise combinations of such information as well as data from other sources.

In an exemplary embodiment when the ATM 202 receives a document which is assessed as being of questionable validity, the control circuitry which is alternatively referred to herein as a controller or processor operating in the ATM, is operative to associate such one or more indicators with the transaction. Further in the exemplary embodiment of a system 200, the control circuitry is operative to cause the ATM to communicate through the network with the appropriate bank 206 to grant a credit to the user for having provided a valid document to the machine. In some embodiments one or more, computers at the bank or otherwise connected to the network may further receive from the controller in the ATM an indication that the machine has received the questionable document from the particular user that requires subsequent assessment. Alternatively or in addition the ATM may provide further information about the questionable document for which a credit has been given. Such information may include for example a serial number from the document, an image of the document or other identifying information related to the particular document which enables the document to be uniquely identified. Other information may include transaction information corresponding to a particular account, date, time, and ATM. In some embodiments the credit that a user or account receives related to a document of questionable validity may be specifically indicated by the controller in the ATM, the bank or both, as being a provisional credit which may be revoked if the document is not later verified as valid. Alternatively in some embodiments the credit granted for a document of questionable validity may be the same as that granted for documents assessed as being of unquestionable validity.

In the exemplary embodiment documents assessed as of questionable validity in the ATM are moved in the ATM to a marking device such as printing device 70. The printing device is operative to place a mark on the document that is of questionable validity. In the exemplary embodiment the marking device is operative responsive to the control circuitry of the ATM to mark the document with a removable mark. The removable mark in some exemplary embodiments may comprise removable ink which can be subsequently removed from a document without damaging the inks or other features that are normally required to be on the document. Alternatively the marking device may apply a removable label, sticker or other subsequently removable item to the document which identifies the particular document as of questionable validity. The marking of a document may also comprise generating unique identifying information which corresponds to a particular unacceptable document, such as corresponding to a serial number on a currency note. The particular document can be kept separated. The document information can be of a suitable format, e.g., digital images, permitting storage thereof in computer memory. The stored document information may be comparable to information in a database to check for improprieties. For example, a serial number on a currency note may match a serial number in a database watch list. Other comparisons may show that the serial number matches a document that was already destroyed. Other comparisons involving computers in real time may show that the serial number matches a document currently in another ATM. The comparing may involve a global computer network capable of accurately tracking currency in the domain of banks, governments, etc.

In some exemplary embodiments the removable mark includes at least a portion of the indicator associated with the transaction. As previously discussed such indicators may include all or portions of the unique transaction number, account number, user identifying data, biometric data or other data which is suitable for use by the system. In the exemplary embodiment the indicator provides specific information so that the particular document can be later identified and the particular user or entity on whose behalf the document has been placed in the machine can later be notified and any credit granted for the document revoked if the document is later determined not to be valid.

In some exemplary embodiments the marking device is operative to mark documents assessed as having questionable validity with a mark comprising visible inks which are visible to users under ambient lighting conditions. Alternatively or in addition marks applied to documents may comprise nonvisible ink or similar materials. In some exemplary embodiments the removable mark may comprise a removable ink which is visible or detectable only when exposed to radiation within a certain frequency range. This may include for example exposure to concentrated ultraviolet light, infrared light or other frequencies. Alternatively or in addition the markings may be comprised of machine readable indicia such as bar code or other indicia corresponding to biometric or other data. Of course it should be understood that these approaches are exemplary and in other embodiments other types of removable marks and indicators may be used.

In operation of the exemplary ATM 202 documents of questionable validity after being marked with the removable mark, are stored in a first storage location in the machine. The first storage location in the exemplary embodiment is a location for storing documents which have been marked and is a different location than the storage locations which are used to store documents that have been assessed as valid. Thus for example in an exemplary embodiment documents that are received by the machine from a user in the course of a first transaction which are assessed as being of questionable validity are marked with the removable mark and placed in a first storage location. Other documents which are assessed as valid are stored in one or more appropriate second storage locations. As a result a document stored in the second location may be later dispensed from the machine to another user in the course of a second transaction in which the subsequent user requests the dispense of such a document.

In some embodiments the removable mark applied to documents of questionable validity is such that the documents may be subsequently assessed or later discussed without removal of the mark. This may include for example marking the documents in locations that do not change or obscure security features or other aspects of the documents that must be assessed to determine validity. Alternatively the marking may be applied in ink or color of a particular type that does not interfere with a subsequent assessing operation with the removable mark still in place. Of course in other embodiments other approaches may be used.

In exemplary ATM 202 documents that are assessed as invalid by the assessing device are captured by the machine. For such documents the control circuitry and other connected computers do not operate to give the user or account holder any credit for such documents. In addition the exemplary ATM 202 includes a device for applying a permanent mark to documents assessed to be invalid. As previously discussed such marking devices for applying a permanent mark may include printing devices which apply a permanent ink or other material to the invalid document. Alternatively the invalid documents may be totally or partially torn, punched or otherwise mutilated so as to be sure that they will not be readily placed in circulation. In some embodiments information concerning the invalid documents may be passed by the machine to the network 204 and to the bank 206. The bank may thereafter communicate through one or more communication systems 208 to the proper authorities 210 for purposes of investigating the circumstances and the source of the invalid documents. Such information may include images of documents, information about the particular user or account associated with deposit of the document, or other information that will facilitate the investigation of the source and/or circumstances surrounding the particular document. Of course such an invalid document may also be stored in an appropriate storage location in the machine for purposes of tracking and later transmission to the authorities who investigate the circumstances related to the presentation of the invalid document. Of course this approach is exemplary and in other embodiments other approaches may be used.

As schematically indicated in FIG. 24 in the exemplary system 200 documents of questionable validity indicated 212 are removed from the ATM machine and transported to an assessing operation schematically indicated 214. In some embodiments documents assessed to be invalid as well as documents assessed to be of questionable validity may be transported to the assessing operation.

It should be appreciated that while the assessing operation 214 of the exemplary embodiment is shown as indicated remotely from the ATM machine, in some embodiments the assessing operation may be conducted adjacent to or even within the automated banking machine.

In the exemplary assessing operation notes of questionable validity are subject to an assessing activity schematically indicated 216. It should be appreciated that the assessing activity 216 may involve machine sensing as well as human sensing of the particular document. As schematically represented by document 218, in the assessing activity the document is preferably assessed for validity with the removable mark 220 remaining in place thereon. As previously discussed this is facilitated in some embodiments by locating the removable mark in an area which does not include significant security features or by providing the removable mark in an ink or other material that does not interfere with assessing the validity of the document. Of course these approaches are exemplary and in other embodiments other approaches may be used.

During the assessing activity, the note or other document of questionable validity is reviewed again to determine whether the document is valid or invalid. In an exemplary embodiment where the document is determined to be valid, the assessing activity through the operation of one or more computers, processors or other devices, communicates messages to the bank 206 and confirms that the particular document is valid. This is represented schematically by a function 222. In response to confirmation that the particular document is valid, the bank 206 or other appropriate entities may take action to remove the provisional nature of the credit previously associated with the deposit of the document. Of course as previously discussed in alternative embodiments such confirmation may not be necessary as no provision is made to make the credit provisional.

In the exemplary embodiment the assessing operation is operative to remove the removable marks from the notes assessed as valid. This is represented by a function 224. The removal of the mark may include the washing and drying of notes with appropriate materials so as to remove the removable mark while not damaging the particular document. This may include for example washing the note with a water-based material and drying the note so as to remove the mark. Alternatively in situations where removable labels or other items have been applied such items are removed in the course of function 224. Of course in some embodiments particularly in cases where the mark is not visible to the naked eye, it may not be necessary to remove the removable mark from the particular document. Whether the removable mark is removed will depend on the particular system, the nature of the mark and the requirement of the particular entity operating the system or the authorities responsible for the document.

The exemplary assessing operation also includes a fitness assessment function schematically indicated 226. The fitness assessment function in the exemplary embodiment is operative to review the document to determine if its character is such that it should be returned to general circulation or transferred to appropriate authorities to be removed from circulation. For example in the case of currency notes that are worn or permanently marked or disfigured, it may be appropriate to deliver such notes for destruction to a central bank or other authority. This will generally avoid further circulation of the note and the need to conduct subsequent analysis in the event that the note should again be presented and assessed to be of questionable validity. Alternatively as schematically represented in FIG. 24, if the document is determined through the fitness assessing function 226 to be suitable to return to circulation, the document is routed to the operations of the bank or other entity responsible for the assessing operation and may be returned to circulation. This may include for example placing the document in a cassette or other container that may be returned to an automated banking machine at which the document may be dispensed in the course of subsequent transactions.

In the exemplary assessing operation 214 if the document is determined to be invalid during accessing activity 216, notice is given to the bank or other entity to revoke the provisional or regular credit. This is represented by a function 228. In the exemplary embodiment the assessing operation is operative to communicate through one or more computers or processors with the bank 206 that the particular document has been assessed as invalid. In response to receiving such notice, the bank operates to revoke the credit that has been given to the particular user or account holder responsible for presenting the document. Because the particular user may face problems with their account if they are not made aware that the credit for the document has been revoked, in the exemplary embodiment the bank 206 notifies the user or account holder that the provisional credit has been revoked. This step is schematically represented 230.

When a document has been determined to be invalid, it may also be appropriate for the bank or other entity to notify the appropriate authorities 210 of the nature of the transaction and/or the invalid document. As schematically represented in FIG. 24, in situations where the document is assessed as invalid, the document is maintained with the marking thereon as represented schematically by a function 232. The document may be maintained with the removable marking thereon and appropriately segregated to avoid any tampering or subsequent distribution of the particular document except to the proper authorities. This may facilitate maintaining an accurate chain of custody for purposes of conducting an investigation of the user or the particular circumstances under which the invalid document was presented to the machine. For example authorities responsible for investigating instances of counterfeit currency may need to obtain the marked document and information related to the transaction and the user for purposes of investigating illegal activity.

Although the exemplary system 200 has been described in connection with documents of questionable validity, such a system may also be used with documents assessed to be invalid. For example documents assessed as invalid by the ATM 202 may nonetheless be reassessed in the assessing operation for purposes of determining if in fact the document is valid. Alternatively in some embodiments documents assessed as invalid may also be marked with a removable mark rather than a permanent mark. Likewise in some embodiments all documents of questionable validity or invalid may be marked with permanent markings. Such markings may be desirable in some circumstances as documents that cannot be assessed as valid may be appropriately marked so as to remove them from circulation. If a document originally assessed as clearly invalid is determined through an assessing operation to in fact be valid, appropriate messages may be sent to the bank or other entities to indicate to the user, account holder or other authorities, that the document was determined to be valid.

It should be understood that system 200 is exemplary and in other embodiments other approaches, devices and method steps may be utilized.

Thus the exemplary embodiment of an automated banking machine and associated methods of the present invention achieves at least some of the above stated objectives, eliminates difficulties encountered in the use of prior devices and systems, solves problems and attains the desirable results described herein.

In the foregoing description certain terms have been used for brevity, clarity and understanding. However, no unnecessary limitations are to be implied therefrom because such terms are used for descriptive purposes and are intended to be broadly construed. Moreover the descriptions and illustrations given are by way of examples and the invention is not limited to the exact details shown or described.

In the following claims any feature described as a means for performing a function shall be construed as encompassing any means known to those skilled in the art to be capable of performing the recited function, and not mere equivalents of the particular means described in the foregoing description. The inclusion of an Abstract shall not be deemed to limit the claimed invention to the features described in such Abstract.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

I claim:

1. Apparatus comprising:
   an automated banking machine including
      at least one assessing device adapted to assess validity of a document in the machine, and
      at least one marking device, wherein the marking device is adapted to mark a document with at least one removable mark responsive to the document being assessed to be of questionable validity, wherein the machine is operative to transport a marked document.

2. The apparatus according to claim 1, wherein the automated banking machine includes at least one receiving device adapted to receive the document from a user, and at least one transport operative to move the document in the machine from the receiving device to the at least one assessing device.

3. The apparatus according to claim 2, and further comprising at least one storage location in the machine, wherein the machine is operative to transport a marked document to a storage location for storage therein.

4. The apparatus according to claim 1, and further comprising control circuitry, wherein the control circuitry is operative to associate at least one indicator with a transaction in which the document is assessed, and wherein the removable mark includes at least a portion of the indicator.

5. The apparatus according to claim 4, wherein the indicator comprises at least one of a transaction number, account number, bar code and indicia corresponding to a biometric feature.

6. The apparatus according to claim 1, wherein the removable mark comprises removable ink.

7. The apparatus according to claim 1, wherein the removable mark comprises visible ink.

8. The apparatus according to claim 7 wherein the removable ink comprises ink visible only when exposed to light in a certain frequency range.

9. The apparatus according to claim 1 wherein the removable mark comprises a removable label.

10. The apparatus according to claim 1 wherein the at least one marking device is adapted to mark another document with at least one permanent mark responsive to the another document being assessed as invalid responsive to operation of the assessing device.

11. The apparatus according to claim 1 wherein the at least one assessing device is adapted to assess validity of a currency note in the machine, and wherein the marking device is adapted to mark a currency note with at least one removable unique identification mark responsive to the document being assessed to be of questionable validity.

12. Apparatus comprising:
   an automated banking machine including
      at least one assessing device, wherein the at least one assessing device is adapted to determine a document validity unacceptable to the machine,
      an information generating device, wherein the information generating device is adapted to generate unique identifying information relating to a document in response to the document being unacceptable to the machine, wherein the identifying information corresponds to at least one readable indicating mark on the document, and wherein the identifying information is unique from other unacceptable document identifying information.

13. The apparatus according to claim 12 wherein the information generating device is adapted to mark the unacceptable document thereon with at least one readable mark related to the information.

14. The apparatus according to claim 13 wherein the information generating device is adapted to mark the unacceptable document thereon with at least one removable mark.

15. The apparatus according to claim 14 wherein the at least one assessing device is adapted to determine a currency note validity unacceptable to the machine, and wherein the information generating device is adapted to mark the currency note responsive to the at least one assessing device being unable to determine that the currency note is genuine.

16. The apparatus according to claim 15 wherein the automated banking machine comprises an ATM adapted to receive a currency note deposit.

17. The apparatus according to claim 13 wherein the information generating device is adapted to mark the unacceptable document thereon with at least one permanent mark.

18. The apparatus according to claim 12 wherein the at least one assessing device is adapted to determine a currency note validity unacceptable to the machine.

19. The apparatus according to claim 18 wherein the information corresponds to a serial number on the currency note.

20. The apparatus according to claim 12 wherein the information generating device is adapted to generate unique identifying information from a serial number of a currency note responsive to the currency note being determined unacceptable to the machine.

21. Apparatus comprising:
   an ATM including
      at least one identifying device, wherein the at least one identifying device is adapted to identify an unacceptable currency note within the ATM,
      a marking device, wherein the marking device is adapted to print mark on an unacceptable currency note within the ATM for unique identification of the unacceptable currency note from marked unacceptable currency notes.

22. The apparatus according to claim 21 wherein the ATM is adapted to receive a currency note deposit, and wherein the marking device is adapted to print at least one removable readable mark on an unacceptable currency note.

23. Apparatus comprising:
   an automated banking machine including
      at least one identifying device, wherein the at least one identifying device is adapted to identify within the machine an unacceptable currency note associated with a requested transaction involving the machine,
      a marking device, wherein the marking device is adapted to mark an unacceptable currency note within the machine with unique identification, wherein the unique identification includes at least a portion of an indicator associated with the requested transaction.

* * * * *